US011847789B2

(12) United States Patent
Li et al.

(10) Patent No.: US 11,847,789 B2
(45) Date of Patent: Dec. 19, 2023

(54) DISTANCE MEASUREMENT METHOD AND ELECTRONIC DEVICE

(71) Applicant: Huawei Technologies Co., Ltd., Shenzhen (CN)

(72) Inventors: Longhua Li, Shanghai (CN); Weitao Zou, Shanghai (CN); Wenyang Zhang, Shanghai (CN); Bing Xia, Shanghai (CN); Shibin Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 81 days.

(21) Appl. No.: 17/482,895

(22) Filed: Sep. 23, 2021

(65) Prior Publication Data
US 2022/0012904 A1    Jan. 13, 2022

Related U.S. Application Data

(63) Continuation of application No. PCT/CN2020/080088, filed on Mar. 19, 2020.

(30) Foreign Application Priority Data

Mar. 26, 2019    (CN) .......................... 201910234876.5

(51) Int. Cl.
*G06T 7/50* (2017.01)
*G06T 7/60* (2017.01)
*H04N 23/63* (2023.01)

(52) U.S. Cl.
CPC .................. *G06T 7/50* (2017.01); *G06T 7/60* (2013.01); *H04N 23/631* (2023.01); *H04N 23/635* (2023.01); *G06T 2207/30201* (2013.01)

(58) Field of Classification Search
None
See application file for complete search history.

(56) References Cited

U.S. PATENT DOCUMENTS 10,444,005 B1 * 10/2019 Dryer .................... G06T 7/60
10,636,158 B1 *  4/2020 Kamiyama ............ G06T 7/50
(Continued)

FOREIGN PATENT DOCUMENTS

CN    101639349 A    2/2010
CN    103759701 A    4/2014
(Continued)

OTHER PUBLICATIONS

Kiaoyuejun, ""Dark Horse" at Black Technology Exhibition A New Version of Fancy AR Ruler Is Announced!," Dec. 2017, URL:https://www.sohu.com/a/210245534_99897326, with English Translation Version, 21 pages.
(Continued)

*Primary Examiner* — Chikaodili E Anyikire
(74) *Attorney, Agent, or Firm* — Conley Rose, P.C.

(57) ABSTRACT

An electronic device receives a first operation to start distance measurement on a measured target. The electronic device displays a first user interface on a display screen in response to the first operation. The first user interface is configured to display an image captured at any angle by a camera. The electronic device receives a second operation performed by a user based on the image. The electronic device adds and displays a first locating point on the first user interface in response to the second operation. The electronic device performs distance measurement on the measured target based on the first locating point to obtain a measurement result of the measured target, and the measurement result is displayed.

20 Claims, 15 Drawing Sheets

(56) References Cited

U.S. PATENT DOCUMENTS

| | | | |
|---|---|---|---|
| 2017/0140216 A1 | 5/2017 | Lin et al. | |
| 2018/0202797 A1 | 7/2018 | Kawashima et al. | |
| 2020/0363527 A1* | 11/2020 | Masuda | G01C 3/08 |
| 2022/0012904 A1 | 1/2022 | Li et al. | |

FOREIGN PATENT DOCUMENTS

| | | |
|---|---|---|
| CN | 105286871 A | 2/2016 |
| CN | 106377264 A | 2/2017 |
| CN | 106705837 A | 5/2017 |
| CN | 108427110 A | 8/2018 |
| CN | 109363684 A | 2/2019 |
| CN | 110136190 A | 8/2019 |
| JP | 2005227194 A | 8/2005 |
| KR | 20090052717 A | 5/2009 |

OTHER PUBLICATIONS

Zhao hui, "EMUI 9.1 This feature is super-use Huawei phone's second scale," May 2019, URL:https://news.mydrivers.com/1/625/625830.htm, with English Translation Version, 16 pages.

Baidu, "How to use AR measurement for Huawei and Honor phones," Jun. 2019, URL:https://jingyan.baidu.com/article/8ebacdf04221de49f65cd535.html, with English Translation Version, 16 pages.

Sohu, "OPPO AR measurement makes it easy to measure the length and distance of an object without a tape measure," Dec. 2018, URL:https://www.sohu.com/a/282993917_100178897, with English Translation Version, 10 pages.

Technology Change Life, "The iPhone has not sold well this year, but the rangefinder app that comes with the system is very good. Will you use it?," Jan. 2019, URL:https://baijiahao.baidu.com/s?id=1621628542018035107andwfr=spiderandfor=pciPhone, with English Translation Version, 19 pages.

Shumamuyi, "iPhone sales are not good this year, but the rangefinder appthat comes with the system is very powerful, would you use it?," Baidu, Jan. 3, 2019, XP55843040, 8 pages.

Dokthurian, S., et al., "Real-Time Vision Based Human Height Measurement Using Sliding Window on Selected Candidates," Proceedings of the TENCON, IEEE Region 10 Conference, Jeju, Korea, Oct. 28-31, 2018, 6 pages.

Jeges, E., et al., "Measuring Human Height Using Calibrated Cameras," Conference on Human System Interactions, Krakow, Poland, May 25-27, 2008, XP031293583, 6 pages.

* cited by examiner

DISTANCE MEASUREMENT METHOD AND ELECTRONIC DEVICE

CROSS-REFERENCE TO RELATED APPLICATIONS

This application is a continuation of International Patent Application No. PCT/CN2020/080088, filed on Mar. 19, 2020, which claims priority to Chinese Patent Application No. 201910234876.5, filed on Mar. 26, 2019. The disclosures of the aforementioned applications are hereby incorporated by reference in their entireties.

TECHNICAL FIELD

This disclosure relates to the field of terminal technologies, and in particular, to a distance measurement method and an electronic device.

BACKGROUND

In daily life and work, there is usually a need for measuring a distance, for example, measuring a height of a person or a height of a table. In most cases, a user performs measurement with a scale or a special instrument, but the user does not necessarily carry the scale or the special instrument. In addition, when the user uses the scale to measure a distance, if the distance to be measured is relatively large, the user may need assistance from other people to complete the measurement.

SUMMARY

Embodiments of this disclosure provide a distance measurement method and an electronic device, to make distance measurement more convenient for a user and help improve user experience.

According to a first aspect, an embodiment of this disclosure provides a distance measurement method. The method includes the following steps:

An electronic device receives a first operation, where the first operation is used to start distance measurement on a measured target; the electronic device displays a first user interface on a display screen in response to the first operation, where the first user interface is configured to display an image captured by a camera, and the image is captured at any angle; the electronic device receives a second operation, where the second operation is an operation performed by a user based on the image; the electronic device adds and displays a first locating point on the first user interface in response to the second operation; then, the electronic device performs distance measurement on the measured target based on the first locating point, to obtain a measurement result of the measured target; and the measurement result is displayed on the first user interface.

In the embodiments of this disclosure, the user may perform distance measurement by using the electronic device, and the electronic device is usually carried by the user. In addition, after completing distance measurement, the electronic device can directly display the measurement result. This makes distance measurement more convenient for the user and helps improve user experience.

In a possible design, the measured target is a person. The first locating point is used to indicate a location of a sole of the measured target. The electronic device may perform distance measurement in the following manners: The electronic device performs facial recognition on the image captured by the camera, and determines a second locating point, where the second locating point is used to indicate a location of the top of the head of the measured target; and the electronic device performs distance measurement on the measured target based on the first locating point and the second locating point, to obtain the measurement result, where the measurement result is used to indicate a height of the measured target. This helps simplify user operations and further improves measurement convenience.

In a possible design, the electronic device may further perform distance measurement in the following manners:

The electronic device receives a third operation, where the third operation is an operation performed by the user based on the image; the electronic device adds and displays a second locating point on the first user interface in response to the third operation; and the electronic device performs distance measurement on the measured target based on the first locating point and the second locating point, to obtain the measurement result. This helps the user perform distance measurement based on a requirement of the user, to improve user experience.

In a possible design, the electronic device performs distance measurement based on the first locating point in the following manners:

The electronic device determines a reference locating point based on the first locating point, where a connection line between the reference locating point and the first locating point is approximately parallel to an edge of a screen of the electronic device; and the electronic device performs distance measurement on the measured target based on the first locating point and the reference locating point, to obtain the measurement result. This helps improve and simplify a measurement manner and improve measurement reliability.

In a possible design, the electronic device performs distance measurement based on the following algorithm:

The electronic device projects the first locating point onto a first reference plane, to obtain a first reference point, where the first reference plane is determined by the electronic device based on an image of an ambient environment of the measured target; then, the electronic device establishes a second reference plane based on the first reference point and a basic reference point, where the second reference plane is perpendicular to the first reference plane, and the basic reference point is located on the first reference plane and is different from the first reference point; the electronic device projects the second locating point onto the second reference plane, to obtain a second reference point; finally, the electronic device measures a perpendicular distance from the second reference point to the second reference plane, to obtain the measurement result of the measured target. This helps simplify an implementation.

In a possible design, the electronic device determines a reference locating point based on the first locating point; and the electronic device projects the reference locating point onto the first reference plane, to obtain the basic reference point. This helps simplify user operations.

In a possible design, the electronic device receives a fourth operation, where the fourth operation is an operation performed by the user based on the image; then, the electronic device adds and displays a reference locating point on the first user interface in response to the fourth operation; finally, the electronic device projects the reference locating point onto the first reference plane, to obtain the basic reference point. Therefore, the user can select different reference point locations based on different distance measurement requirements.

It should be noted that the basic reference point location in the embodiments of this disclosure is equivalent to a second locating point in the distance measurement method shown in FIG. 5A and FIG. 5B, and the second locating point according to the first aspect of the embodiments of this disclosure is equivalent to a third locating point in the distance measurement method shown in FIG. 5A and FIG. 5B.

According to a second aspect, an embodiment of this disclosure provides an electronic device. The electronic device includes: a memory, a processor, a display screen, and a camera, where the processor is connected to the display screen, the memory, and the camera; a plurality of applications; and one or more computer programs, where the one or more computer programs are stored in the memory, the one or more computer programs include instructions, and when the instructions are executed by the electronic device, the electronic device is enabled to perform the following steps: receiving a first operation, where the first operation is used to start distance measurement on a measured target; displaying a first user interface on the display screen in response to the first operation, where the first user interface is configured to display an image captured by the camera, and the image is captured at any angle; receiving a second operation, where the second operation is an operation performed by a user based on the image; adding and displaying a first locating point on the first user interface in response to the second operation; performing distance measurement on the measured target based on the first locating point, to obtain a measurement result of the measured target; and displaying the measurement result on the first user interface.

In a possible design, the measured target is a person. The first locating point is used to indicate a location of a sole of the measured target. Distance measurement may be performed based on the first locating point in the following manners: performing facial recognition on the image captured by the camera, and determining a second locating point, where the second locating point is used to indicate a location of the top of the head of the measured target; and performing distance measurement on the measured target based on the first locating point and the second locating point, to obtain the measurement result, where the measurement result is used to indicate a height of the measured target.

In a possible design, distance measurement may be further performed based on the first locating point in the following manners: receiving a third operation, where the third operation is an operation performed by the user based on the image; adding and displaying a second locating point on the first user interface in response to the third operation; and performing distance measurement on the measured target based on the first locating point and the second locating point, to obtain the measurement result.

In a possible design, distance measurement is performed based on the first locating point in the following manners: determining a reference locating point based on the first locating point, where a connection line between the reference locating point and the first locating point is approximately parallel to an edge of a screen of the electronic device; and performing distance measurement on the measured target based on the first locating point and the reference locating point, to obtain the measurement result.

In a possible design, distance measurement may be performed based on the first locating point and the second locating point in the following manners: projecting the first locating point onto a first reference plane, to obtain a first reference point, where the first reference plane is determined by the electronic device based on an image of an ambient environment of the measured target; establishing a second reference plane based on the first reference point and a basic reference point, where the second reference plane is perpendicular to the first reference plane, and the basic reference point is located on the first reference plane and is different from the first reference point; projecting the second locating point onto the second reference plane, to obtain a second reference point; and measuring a perpendicular distance from the second reference point to the second reference plane, to obtain the measurement result of the measured target.

In a possible design, when the instructions are executed by the electronic device, the electronic device is enabled to further perform the following steps: determining a reference locating point based on the first locating point; and projecting the reference locating point onto the first reference plane, to obtain the basic reference point.

In a possible design, when the instructions are executed by the electronic device, the electronic device is enabled to further perform the following steps: receiving a fourth operation, where the fourth operation is an operation performed by the user based on the image; adding and displaying a reference locating point on the first user interface in response to the fourth operation; and projecting the reference locating point onto the first reference plane, to obtain the basic reference point.

According to a third aspect, an embodiment of this disclosure provides another electronic device, where the electronic device includes an apparatus or a function module that performs the first aspect and any possible design of the first aspect.

According to a fourth aspect, an embodiment of this disclosure provides a chip. The chip is coupled to a memory in a terminal. Therefore, when the chip runs, a computer program stored in the memory is invoked to implement the method according to the first aspect and any possible design of the first aspect in the embodiments of this disclosure.

According to a fifth aspect, an embodiment of this disclosure provides a computer storage medium. The computer storage medium stores a computer program, and when the computer program is run on a terminal, the terminal is enabled to perform the method according to the first aspect and any possible design of the first aspect.

According to a sixth aspect, an embodiment of this disclosure provides a computer program product. When the computer program product is run on a terminal, the terminal is enabled to perform the method according to the first aspect and any possible design of the first aspect.

In addition, for technical effects implemented in any possible design manner in the second aspect to the sixth aspect, refer to the technical effects implemented in different design manners in the first aspect. Details are not described herein again.

DESCRIPTION OF EMBODIMENTS

The distance measurement method in the embodiments of this disclosure is applied to an electronic device. Generally, a user carries an electronic device. Therefore, when the user has a need for measuring a distance, the user may use the electronic device to perform measurement. This makes distance measurement more convenient for the user and helps improve user experience.

The following describes an electronic device, a graphical user interface (GUI) used for such an electronic device, and embodiments for using such an electronic device.

The electronic device in the embodiments of this disclosure may be a portable electronic device, for example, a mobile phone, a tablet computer, or a wearable device (such as a smartwatch). An example embodiment of the portable electronic device includes but is not limited to a portable electronic device using ISO®, Android®, Microsoft®, or another operating system. The portable electronic device may alternatively be a laptop or the like.

Figure 1:
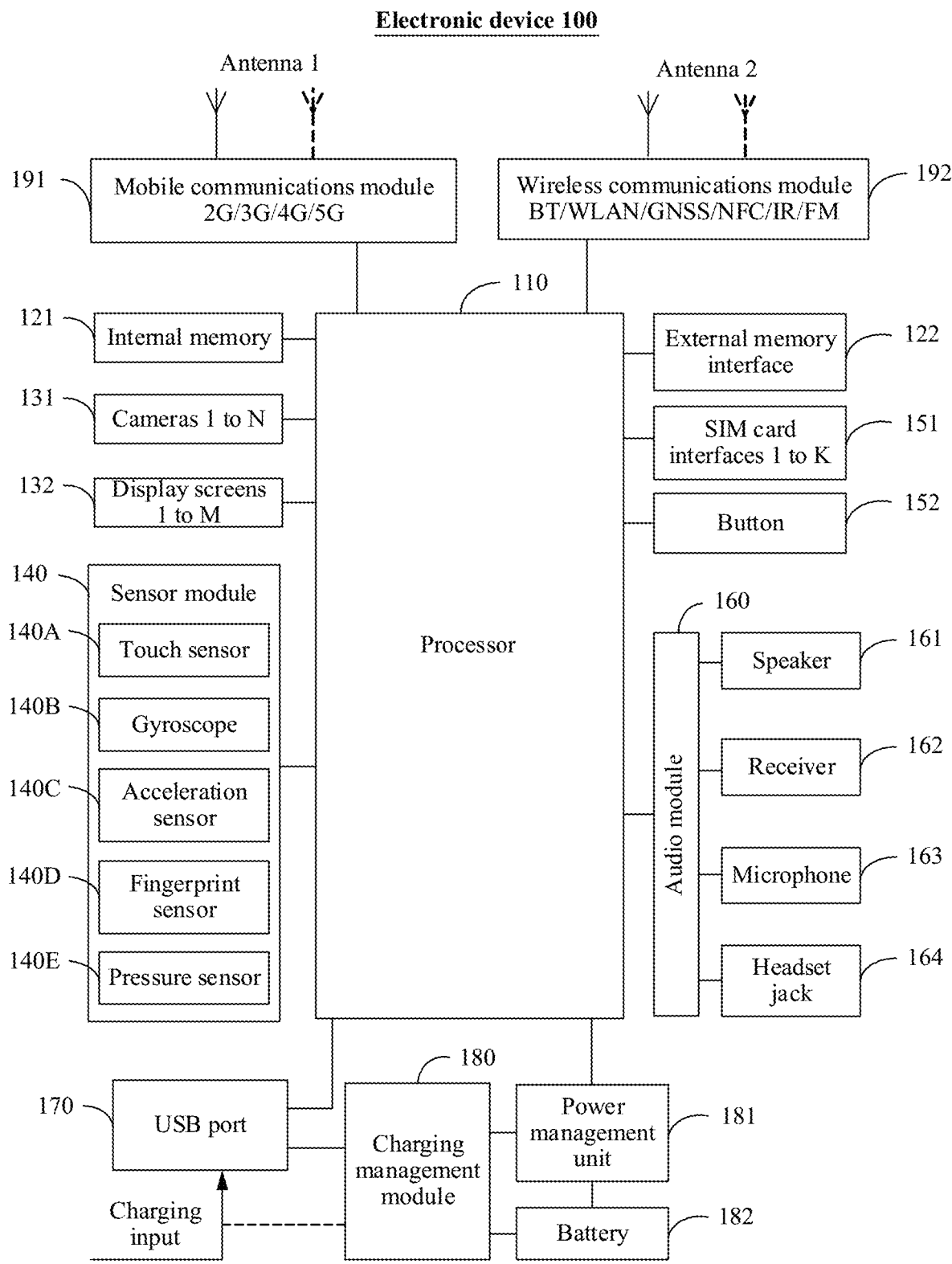
FIG. 1 is a schematic architectural diagram of an electronic device according to an embodiment of this disclosure.

For example, FIG. 1 is a schematic structural diagram of an electronic device according to an embodiment of this disclosure. For example, as shown in the figure, the electronic device 100 includes a processor 110, an internal memory 121, an external memory interface 122, a camera 131, a display screen 132, a sensor module 140, a subscriber identity module (SIM) card interface 151, a button 152, an audio module 160, a speaker 161, a receiver 162, a microphone 163, a headset jack 164, a universal serial bus (USB) port 170, a charging management module 180, a power management unit 181, a battery 182, a mobile communications module 191, and a wireless communications module 192. In some other embodiments, the electronic device 100 may further include a motor, an indicator, and the like.

It should be understood that a hardware structure shown in FIG. 1 is merely an example. The electronic device in this embodiment of this disclosure may have more or fewer components than those of the electronic device 100 shown in the figure, may combine two or more components, or may have different component configurations. The components shown in the figure may be implemented in hardware including one or more signal processing and/or application-specific integrated circuits, software, or a combination of hardware and software.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors.

In some other embodiments, a memory may further be disposed in the processor 110, and is configured to store instructions and data. For example, the memory in the processor 110 may be a cache. The memory may be configured to store instructions or data just used or cyclically used by the processor 110. If the processor 110 needs to use the instructions or data again, the processor 110 may directly invoke the instructions or data from the memory. This helps avoid repeated access, and reduces waiting time of the processor 110, thereby improving system efficiency.

The internal memory 121 may be configured to store one or more computer programs, and the one or more computer programs include instructions. The processor 110 may run the instructions stored in the internal memory 121, to enable the electronic device 100 to perform the distance measurement method provided in some embodiments of this disclosure, other function applications, data processing, and the like. The internal memory 121 may include a program storage area and a data storage area. The program storage area may store an operating system. The program storage area may further store one or more applications (for example, a camera and a range finder), and the like. The data storage area may store data (for example, an image and a contact) created during use of the electronic device 100, and the like In addition, the internal memory 121 may include a high-speed random access memory, or may include a non-volatile memory, for example, at least one magnetic disk storage device, a flash memory device, or a Universal Flash Storage (UFS). In some embodiments, the processor 110 may run the instructions stored in the internal memory 121 and/or instructions stored in the memory disposed in the processor 110, to enable the electronic device 100 to perform the distance measurement method provided in the embodiments of this disclosure, other function applications, and data processing.

The external memory interface 122 may be configured to connect to an external memory card (for example, a micro SD card), to extend a storage capability of the electronic device 100. The external memory card communicates with the processor 110 through the external memory interface 122, to implement a data storage function. For example, files such as images, music, and videos are stored in the external memory card.

The camera 131 is configured to capture a dynamic image, a static image, and the like. Generally, the camera 131 includes a lens and an image sensor. An optical image of an object is generated through the lens, and is projected onto the image sensor. The image sensor may be a charge-coupled device (CCD) or a complementary metal-oxide-semiconductor (CMOS) photoelectric transistor. The image sensor converts an optical signal into an electrical signal, and then transmits the electrical signal to the ISP to convert the electrical signal into a digital image signal. In some embodiments, the electronic device 100 may include one or N cameras 131, where N is a positive integer greater than or equal to 1. For example, the electronic device 100 may include two cameras 131, where one camera 131 is a front-facing camera, and the other camera 131 is a rear-facing camera. For another example, the electronic device 100 may alternatively include three cameras 131, where one camera 131 is a front-facing camera, and the other two cameras 131 are rear-facing cameras. Alternatively, one camera 131 is a rear-facing camera, and the other two cameras 131 are front-facing cameras. For another example, the electronic device 100 includes four cameras 131, where one camera 131 is a front-facing camera, and the other three cameras 1313 are rear-facing cameras.

The display screen 132 may be configured to display an image, a video, or the like. The display screen 132 may include a display panel. The display panel may use a liquid-crystal display (LCD), an organic light-emitting diode (OLED), an active-matrix organic light-emitting diode or an active-matrix organic light-emitting diode (AMOLED), a flex light-emitting diode (FLED), a Miniled, a MicroLed, a Micro-oLed, a quantum-dot light-emitting diode (QLED), or the like. In some embodiments, the electronic device 100 may include one or M display screens 132, where M is a positive integer greater than 1. For example, the electronic device 100 may implement a display function by using the GPU, the display screen 132, the application processor, and the like.

The sensor module 140 may include one or more sensors such as a touch sensor 140A, a gyroscope 140B, an acceleration sensor 140C, a fingerprint sensor 140D, and a pressure sensor 140E. In some embodiments, the sensor module 140 may further include an ambient light sensor, a distance sensor, an optical proximity sensor, a bone conduction sensor, a temperature sensor, and the like.

The touch sensor 140A may also be referred to as a "touch panel". The touch sensor 140A may be disposed in the display screen 131, and the touch sensor 140A and the display screen 131 form a touchscreen, which is also referred to as a "touchscreen". The touch sensor 140A is configured to detect a touch operation performed on or near the touch sensor 140A. The touch sensor 140A may transfer the detected touch operation to the application processor, to determine a type of a touch event. The electronic device 100 may provide, by using the display screen 131, a visual output related to the touch operation. In some other embodiments, the touch sensor 140A may alternatively be disposed on a surface of the electronic device 100, and is located at a position different from that of the display screen 131.

The gyroscope 140B may be configured to determine a motion posture of the electronic device 100. In some embodiments, an angular velocity of the electronic device 100 around three axes (namely, axes x, y, and z) may be determined by using the gyroscope 140B. The gyroscope 140B may be configured to perform image stabilization during photographing. For example, when a shutter is pressed, the gyroscope 140B detects a shaking angle of the electronic device 100, calculates, based on the angle, a distance for which a lens module needs to compensate, and allows the lens to eliminate the shaking of the electronic device 100 through reverse motion, to implement image stabilization. The gyro sensor 140B may also be used in navigation and motion sensing game scenarios.

The acceleration sensor 140C may detect accelerations in various directions (usually on three axes) of the electronic device 100, and may detect magnitude and a direction of gravity when the electronic device 100 is still. The acceleration sensor 140C may be further configured to identify a posture of the electronic device 100, and is applied to switching between a landscape mode and a portrait mode, and applications such as a pedometer.

The fingerprint sensor 140D is configured to collect a fingerprint. The electronic device 100 may implement fingerprint-based unlocking, application access locking, fingerprint-based photographing, fingerprint-based call answering, and the like by using a feature of the collected fingerprint.

The pressure sensor 140E is configured to sense a pressure signal, and can convert the pressure signal into an electrical signal. For example, the pressure sensor 140E may be disposed on the display screen 132. In some embodiments, touch operations that are performed at a same touch location but have different touch operation intensities may correspond to different operation instructions.

The button 152 includes a power button, a volume button, and the like. The button 152 may be a mechanical button, or may be a touch button. The electronic device 100 may receive a button input, and generate a button signal input related to user settings and function control of the electronic device 100. For example, the electronic device 100 includes a volume up button and a volume down button. Both the volume up button and the volume down button are mechanical buttons. The volume up button is used to control the electronic device to increase volume, and the volume down button is used to control the electronic device to decrease volume.

The electronic device 100 may implement audio functions by using the audio module 160, the speaker 161, the receiver 162, the microphone 163, the headset jack 164, the application processor, and the like.

The mobile communications module 191 can provide a solution, applied to the electronic device 100, for wireless communications including 2G/3G/4G/5G or the like. The mobile communications module 191 may include a filter, a switch, a power amplifier, a low-noise amplifier (LNA), and the like.

The wireless communications module 192 can provide wireless communications solutions that are applied to the electronic device, for example, WLAN (such as a Wi-Fi network), Bluetooth (BT), global navigation satellite system (GNSS), frequency modulation (FM), near field communication (NFC), and infrared (IR) technologies. The wireless communications module 192 may be one or more devices that integrate at least one communications processing module.

In some embodiments, an antenna 1 of the electronic device 100 is coupled to the mobile communications module 191, and an antenna 2 is coupled to the wireless communications module 192, so that the electronic device 100 can communicate with another device.

The SIM card interface 151 is configured to connect to a SIM card. The SIM card may be inserted in the SIM card interface 151 or removed from the SIM card interface 151, to implement contact with or separation from the electronic device 100. The electronic device 100 can support one or K SIM card interfaces 151, where K is a positive integer greater than 1. The SIM card interface 151 can support a nano-SIM card, a micro-SIM card, a SIM card, and the like. A plurality of cards can be simultaneously inserted into the same SIM card interface 151. The plurality of cards may be of a same type or of different types. The SIM card interface 151 may also be compatible with different types of SIM cards. The SIM card interface 151 may also be compatible with an external memory card. The electronic device 100 interacts with a network through the SIM card, to implement functions such as calling and data communications. In some embodiments, the electronic device 100 uses an eSIM, namely, an embedded SIM card. The eSIM card may be embedded in the electronic device 100, and cannot be separated from the electronic device 100.

The USB port 170 is an interface that complies with a USB standard specification, and may be specifically a mini USB port, a micro USB port, a USB Type-C port, or the like. The USB port 170 may be configured to connect to a charger to charge the electronic device 100, or may be used for data transmission between the electronic device 100 and a peripheral device, or may be configured to connect to a headset, to play audio by using the headset. For example, the headset jack 164 may be a USB port 170. This interface may further be configured to connect to another electronic device, for example, an augmented reality (AR) device.

The charging management module 180 is configured to receive a charging input from the charger. The charger may be a wireless charger or a wired charger. In some embodiments of wired charging, the charging management module 180 may receive a charging input from a wired charger through the USB port 170. In some embodiments of wireless charging, the charging management module 180 may receive a wireless charging input by using a wireless charging coil of the electronic device 100. The charging management module 180 supplies power to the electronic device 100 by using the power management unit 180 while charging the battery 182.

The power management unit 181 is configured to connect the battery 182 and the charging management module 180 to the processor 110. The power management unit 181 receives an input of the battery 182 and/or the charging management module 180, and supplies power to the processor 110, the internal memory 121, an external memory, the display screen 132, the camera 131, and the like. The power management unit 181 may be further configured to monitor parameters such as a battery capacity, a battery cycle count, and a battery health status (electric leakage or impedance). In some other embodiments, the power management unit 181 may alternatively be disposed in the processor 110. In some other embodiments, the power management unit 181 and the charging management module 180 may alternatively be disposed in a same device.

The following describes in detail this embodiment of this disclosure with reference to a schematic structural diagram of the electronic device 100 shown in FIG. 1.

It should be understood that the distance measurement method in this embodiment of this disclosure may be implemented by using an application, or by integrating a distance measurement function in an application. For example, when the distance measurement method in this embodiment of this disclosure is implemented by using an application, the application may be an application independently used for distance measurement, for example, a distance meter or a measuring meter. A name of the application independently used for distance measurement is not limited in this embodiment of this disclosure. For another example, when the distance measurement method in this embodiment of this disclosure is implemented by integrating a distance measurement function in an application, the application may be an application having a shooting function, for example, a camera. The following describes the distance measurement method in this embodiment of this disclosure by using a measuring meter as an example.

Figure 2:
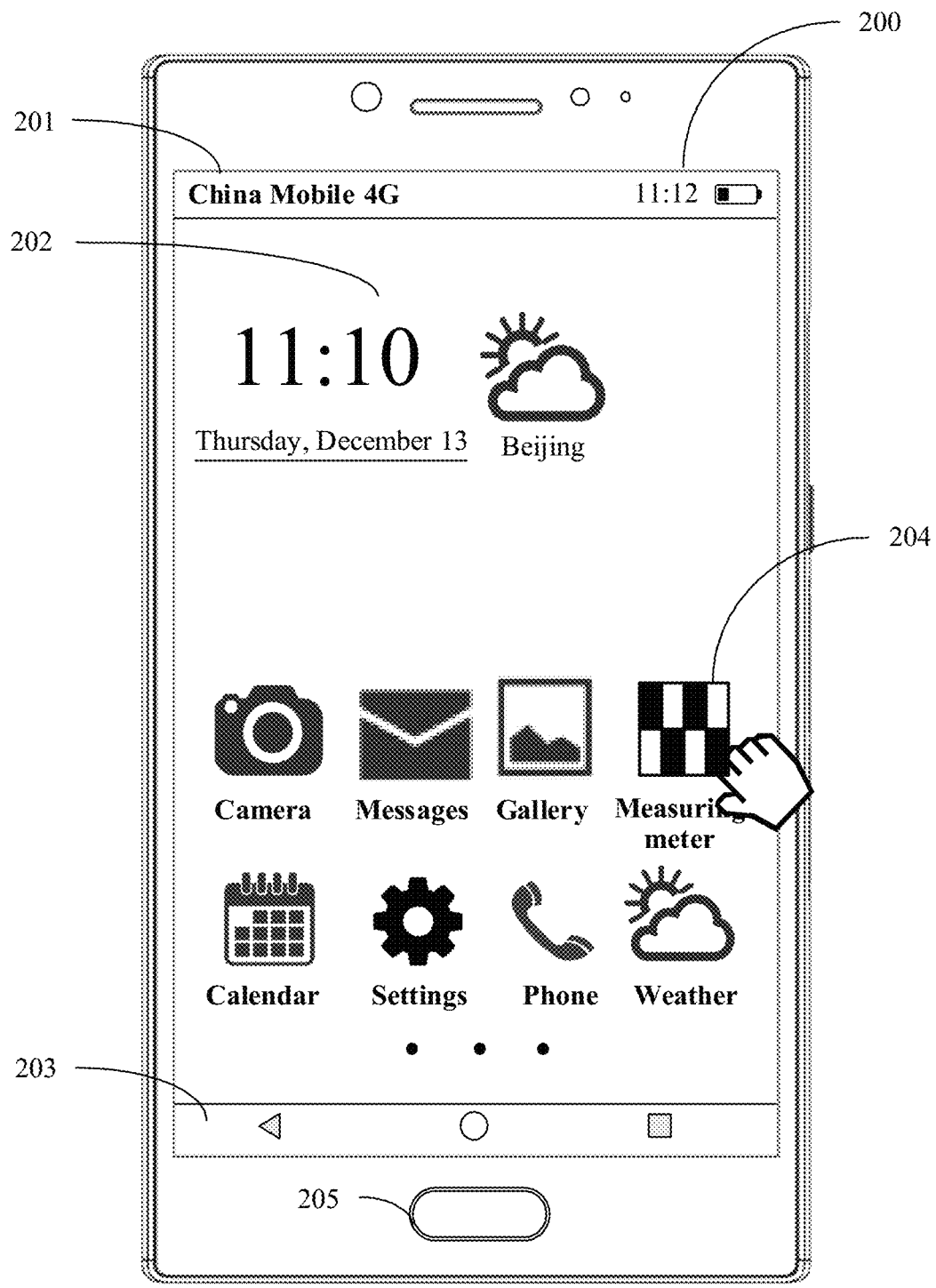
FIG. 2 is a schematic diagram of a user interface according to an embodiment of this disclosure.

In this embodiment of this disclosure, the electronic device 100 displays a graphical user interface by using the display screen 132. The graphical user interface is referred to as a user interface for short below. Specifically, the user interface may be a home screen, a leftmost screen, a user interface of an application, or the like. For example, the home screen may be a user interface 200 shown in FIG. 2. As shown in FIG. 2, the user interface 200 may include a status bar 201, a time and weather widget 202, a collapsible navigation bar 203, and a plurality of application icons such as a measuring meter icon 204. It should be noted that the measuring meter icon 204 shown in FIG. 2 is merely an example. In this embodiment of this disclosure, the measuring meter icon 204 may alternatively be an icon in another form. This is not limited. For example, the status bar 201 may include a name of an operator (for example, China Mobile), a mobile network (for example, 4G), time, and remaining power. In some other embodiments of this disclosure, the status bar 201 may further include one or more of a Bluetooth icon, a Wi-Fi icon, a signal strength icon, a screen lock icon, an external device icon, or the like. The navigation bar 203 may include a back button, a home button, and a history task view button (menu button). It may be further understood that, in some other embodiments, the user interface 200 may further include a Dock bar. The Dock bar may include commonly used application icons, such as a phone icon, an SMS message icon, an email icon, and a weather icon. It should be noted that a user may set a commonly used application icon in the Dock bar based on a requirement of the user.

In some other embodiments, as shown in FIG. 2, the electronic device 100 may include a home button 205. The home button 205 may be a physical key or a physical button, or may be a virtual key or a virtual button. The home button 205 is configured to return a user interface, for example, a user interface of an application or the leftmost screen that is displayed on the display screen 132 to the home screen based on an operation of the user, so that the user can conveniently view the home screen at any time and perform an operation on a control (for example, an icon) on the home screen. The operation may be specifically that the user presses the home button 205. In some other embodiments of this disclosure, the home button 205 may be further integrated with the fingerprint sensor 140D. Therefore, when the user presses the home button 205, the electronic device 100 may collect a fingerprint to confirm an identity of the user. In some other embodiments, the electronic device 100 may not include the home button 205.

The electronic device 100 in this embodiment of this disclosure may start an application in response to a touch operation performed by the user on an icon of the application, and display a user interface of the application on the display screen 132. For example, the electronic device 100 in this embodiment of this disclosure may respond, in the following manner, to a touch operation performed by the user on an icon of an application: After detecting a touch operation performed by a finger of the user (or a stylus, or the like) on an icon of an application, the touch sensor 140A of the electronic device 100 reports the touch operation to the processor 110, so that the processor 110 starts the application in response to the touch operation, and a user interface of the application is displayed on the display screen 132. The measuring meter icon 204 is used as an example. After detecting a touch operation on the measuring meter icon 204, the touch sensor 140A reports the touch operation on the measuring meter icon 204 to the processor 110. Then, the processor 110 starts, in response to the touch operation, an application corresponding to the measuring meter icon 204 (the "application corresponding to the measuring meter icon 204" is referred to as a "measuring meter" for short below), and a user interface of the measuring meter is displayed on the display screen 132. In addition, in this embodiment of this disclosure, the electronic device 100 may alternatively start the measuring meter in another manner. For example, in a case in which a screen is turned off, a screen is locked, or the display screen 132 displays a user interface (for example, a home screen, a leftmost screen, or a user interface of another application), the electronic device 100 may start the measuring meter in response to a shortcut gesture operation (for example, swiping up with three fingers, or knocking on the display screen 132 with a knuckle for two consecutive times) of the user, or an operation such as a voice command, and display the user interface of the measuring meter on the display screen 132. It should be noted that a manner in which the electronic device 100 starts the measuring meter is not limited in this embodiment of this disclosure.

Figure 3:
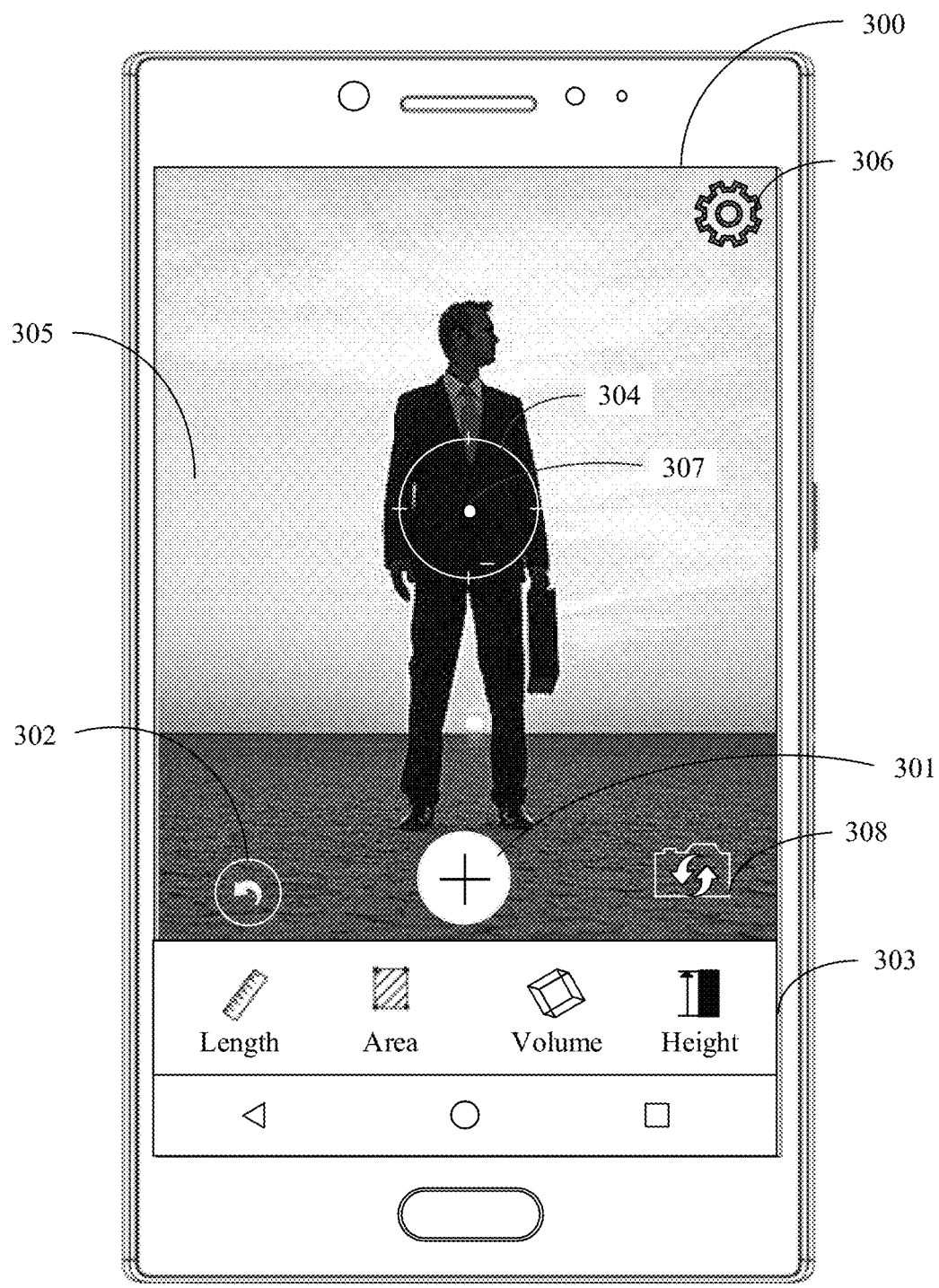
FIG. 3 is a schematic diagram of another user interface according to an embodiment of this disclosure.

For example, the user interface of the measuring meter may be a user interface 300 shown in FIG. 3. The user interface 300 includes an image preview area 305. The image preview area 305 is configured to display a preview image. The preview image may be an image captured by the camera 131 in real time, or may be an image stored in the electronic device 100. The image captured by the camera 131 in real time is used as an example. For example, the preview image may be an image captured by one or more front-facing cameras in real time, or may be an image captured by one or more rear-facing cameras in real time. It should be noted that the camera 131 may be turned on by the electronic device 100 in response to an operation of starting the measuring meter, or may be always in a turned-on state. This is not limited. In some embodiments, the user interface 300 may further include a virtual button 301, a virtual button 302, and a locating point location indication box 304. For example, the virtual button 301, the virtual button 302, and the locating point location indication box 304 may be displayed on the user interface 300 only after the electronic device 100 establishes the world coordinate system, and are not displayed before the world coordinate system is established. For another example, the virtual button 301, the virtual button 302, and the locating point location indication box 304 may be displayed after the measuring meter is started. It should be noted that the world coordinate system is a coordinate system of three-dimensional space, and the world coordinate system establishes a reference system for describing another coordinate system. That is, the world coordinate system may be used to describe all other coordinate systems or object locations.

The virtual button 301 is used to add a locating point on the user interface 300. For example, the locating point in this embodiment of this disclosure is indicated by coordinates in an image coordinate system. It should be noted that the image coordinate system in this embodiment of this disclosure may also be referred to as a plane coordinate system. For example, the image coordinate system may be a coordinate system in which the display screen 132 or a user interface displayed on the display screen 132 is used as a reference. Therefore, in this embodiment of this disclosure, coordinates of the locating point added by the user on the user interface 300 based on the preview image in the image coordinate system are two-dimensional. The virtual button 302 is configured to cancel a last operation. The center 307 of the locating point location indication block 304 is used to indicate a location of a to-be-added locating point on the user interface 300. Specifically, the user may perform adjustment based on a requirement of the user, so that after a location of a locating point that needs to be added on the user interface 300 is aligned with the center 307 of the locating point location indication box 304, the user performs an operation (for example, a touch operation) on the virtual button 301, to complete adding of the locating point on the user interface 300. For example, the center 307 of the locating point location indication box 304 is located at a location in the image preview area 305, and is fixed. For example, the center of the locating point location indication box 304 is a center of the image preview area 305, and is fixed. This facilitates the user to add a locating point on the user interface 300. Specifically, in this case, the user may adjust, by moving the electronic device 100, the preview image displayed on the image preview area 305, so that a location of a locating point that needs to be added on the user interface 300 is adjusted to the center 307 of the locating point location indication box 304. For example, if the user needs to add a locating point to a location of a sole of a person in the preview image displayed on the user interface 300, the user may move the electronic device 100 upward to adjust the location of the sole of the person in the preview image to the center 307 of the locating point location indication box 304. Then, the user operates the virtual button 301. In this case, the electronic device 100 may add the locating point on the user interface 300 in response to the operation on the virtual button 301. For another example, the center 307 of the locating point location indication box 304 in this embodiment of this disclosure may also be correspondingly adjusted based on a requirement of the user. In other words, a location of the locating point location indication box 304 may be changed. Therefore, the center 307 of the locating point indication box 304 may also change correspondingly with the change of the locating point indication box 304. In this case, if the user needs to add a locating point to a location of a sole of a person, the user may perform a moving operation on the locating point location indication box 304, so that the center 307 of the locating point location indication box 304 is moved to the location of the sole of the person in the preview image. Then, the user operates the virtual button 301. In this case, the electronic device 100 may add, in response to the operation on the virtual button 301, the locating point to the location of the sole of the person in the displayed preview image on the user interface 300. In some other embodiments of this disclosure, the electronic device 100 may alternatively identify the preview image, and automatically add a locating point on the user interface 300. For example, measuring a height of a person is used as an example. The electronic device 100 may automatically add a locating point on the user interface 300 by recognizing the top of the head of a person in the preview image. The locating point indicates a location of the top of the head of the person in the preview image displayed on the user interface 300. This helps reduce user operations.

Figure 4:
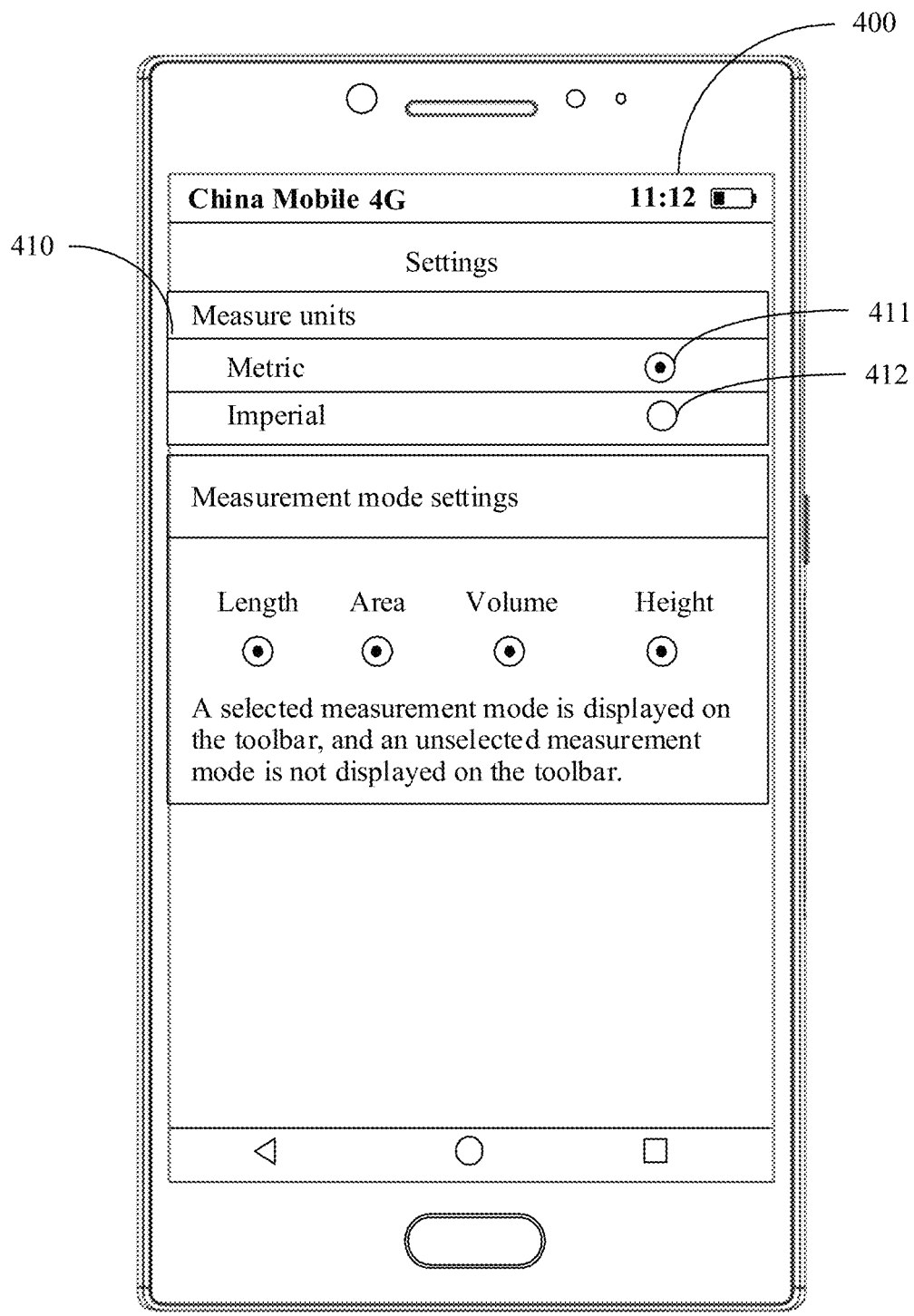
FIG. 4 is a schematic diagram of another user interface according to an embodiment of this disclosure.

In some embodiments, the user interface 300 may further include a toolbar 303. The toolbar 303 includes at least two measurement modes, for example, at least two measurement modes of "Length", "Area", "Volume", or "Height". The electronic device 100 may perform corresponding measurement on the measured target in the preview image in response to a measurement mode selected by the user. For example, in response to "Height" selected by the user, the electronic device 100 perform corresponding measurement on a height of the measured target in the preview image. For example, the measured target may be a person, or may be an animal, or the like. For example, when the preview image includes a plurality of persons, the electronic device 100 may separately measure heights of the plurality of persons. For another example, the electronic device 100 may measure a length of the measured target in the preview image in response to "Length" selected by the user. For example, the measured target may be an object such as a table or a chair. In addition, in some other embodiments, the user interface 300 may further include a virtual button 306. The virtual button 306 is configured to perform corresponding settings on the measuring meter. For example, the electronic device 100 may display, in response to an operation on the virtual button 306, a setting interface of the measuring meter on the display screen 132. The setting interface of the measuring meter may include one or more virtual buttons used to set the measuring meter. For example, the setting interface of the measuring meter may be a user interface 400 shown in FIG. 4. As shown in FIG. 4, the user interface 400 includes a measure unit setting block 410, where the measure unit setting block 410 includes a metric option 401 and an imperial option 402. The electronic device 100 may set a measure unit of the measuring meter to a metric system in response to the metric option 401 selected by the user. For example, when the electronic device 100 sets a measure unit of the measuring meter to the metric system, if the electronic device 100 measures a distance, a unit of the distance measured by the electronic device 100 is meter (m). It should be noted that in this embodiment of this disclosure, the metric option 401 and the imperial option 402 cannot be selected by the user at the same time. In addition, the user interface 400 may further include a measurement mode setting box, which may include one or more measurement mode options. For example, the measurement mode settings box includes a length option, an area option, a volume option, and a height option. The electronic device 100 may display a selected corresponding measurement mode in the toolbar 303 in response to one or more of the length option, the area option, the volume option, or the height option selected by the user. For example, if the user selects the length option, the area option, the volume option, and the height option, the toolbar 303 includes "Length", "Area", "Volume", and "Height". For another example, if the user selects the length option and the height option, the toolbar 303 includes "Length" and "Height".

In this embodiment of this disclosure, the electronic device 100 may add two locating points related to the measured target to the preview image, and perform corresponding measurement on a height, a length, a width, or the like of the measured target based on the two locating points.

In some embodiments, the user interface 300 may further include a virtual button 308, where the virtual button 308 is configured to control the electronic device 100 to switch between a front-facing camera and a rear-facing camera, to help use by the user. For example, a preview image displayed on the image preview area 305 is an image captured by the rear-facing camera, and the electronic device 100 may switch the rear-facing camera to the front-facing camera in response to an operation performed by the user on the virtual button 308. In this case, the preview image displayed on the image preview area 305 is switched to the image captured by the front-facing camera image.

It should be noted that, for the electronic device 100, the virtual button 308 is similar to the virtual button 302, the virtual button 301, and the locating point location indication box 307, and may be displayed after the electronic device 100 establishes the world coordinate system, and not be displayed before the world coordinate system is established, or may be displayed after the measuring meter is started. For example, after the electronic device 100 starts the measuring meter, the toolbar 303 may be included on the user interface 300 displayed on the display screen 132, so that the user can select a measurement mode. For example, the electronic device 100 may hide the toolbar 303 in response to an operation (for example, a slide-down operation) of the user. After hiding the toolbar 303, the electronic device 100 may display the toolbar 303 again on the user interface 300 displayed on the display screen 132 in response to another operation (for example, a slide-up operation) of the user.

Figure 5A:
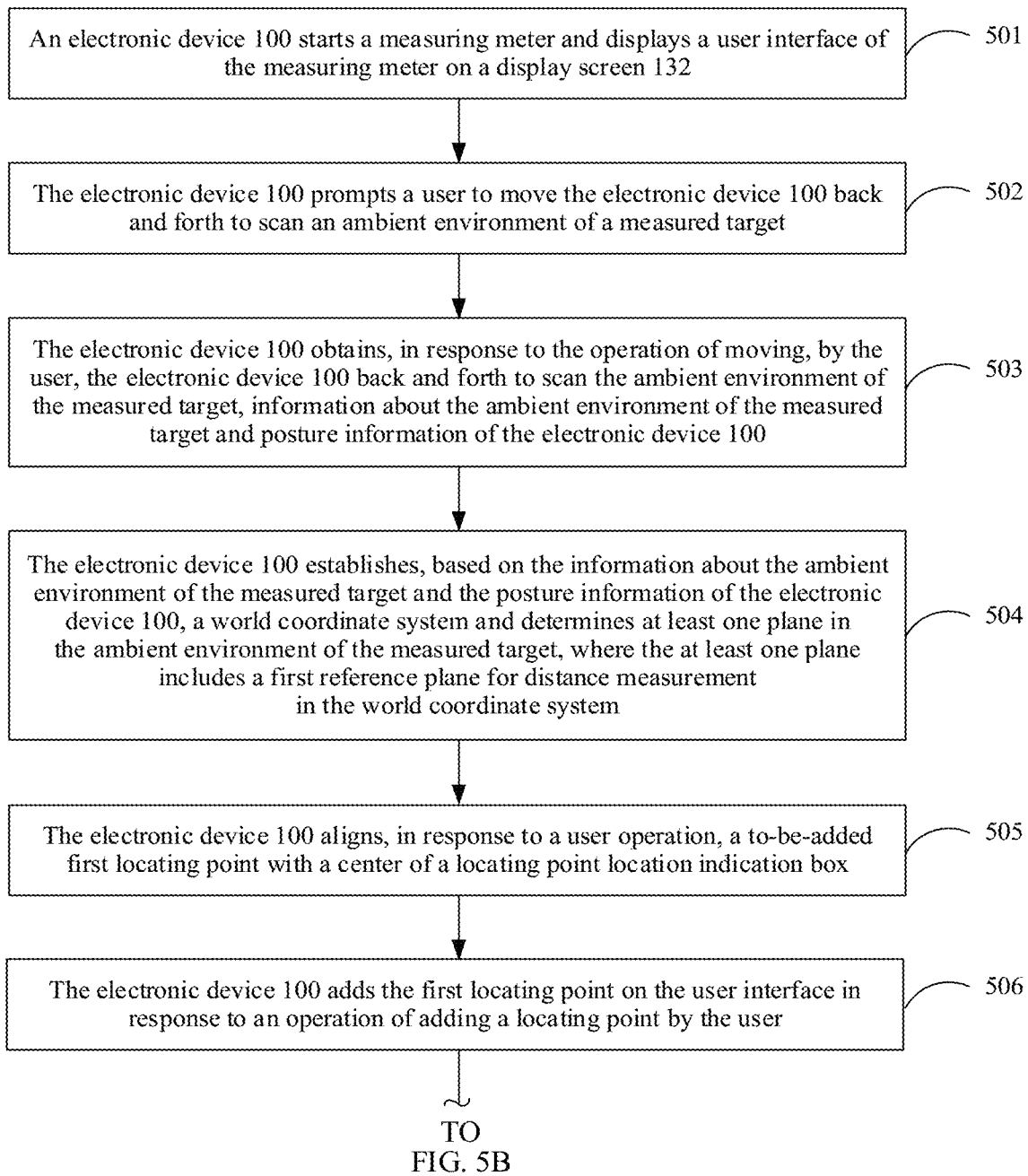
FIG. 5A and FIG. 5B are a schematic flowchart of a distance measurement method according to an embodiment of this disclosure.
Figure 5B:
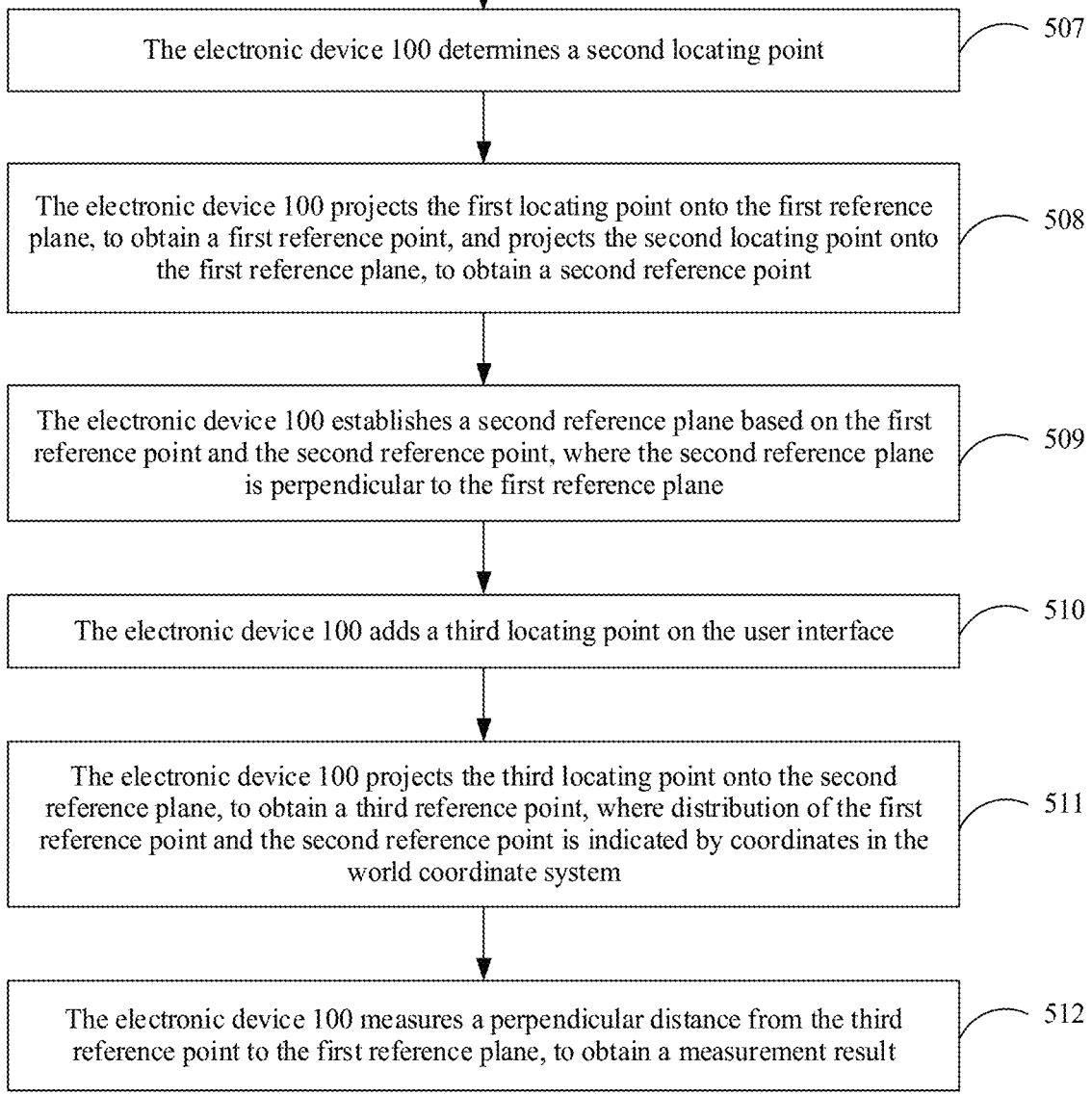

Specifically, FIG. 5A and FIG. 5B show a distance measurement method according to an embodiment of this disclosure. The method includes the following steps.

Step 501: An electronic device 100 starts a measuring meter and displays a user interface of the measuring meter on a display screen 132. The user interface includes an image preview area, and the image preview area is used to display an image captured by the camera 131.

It should be noted that, for related descriptions of the user interface of the measuring meter, refer to related descriptions of the user interface 300, and details are not described herein again.

Step 502: The electronic device 100 prompts a user to move the electronic device 100 back and forth to scan an ambient environment of a measured target.

Figure 6A:
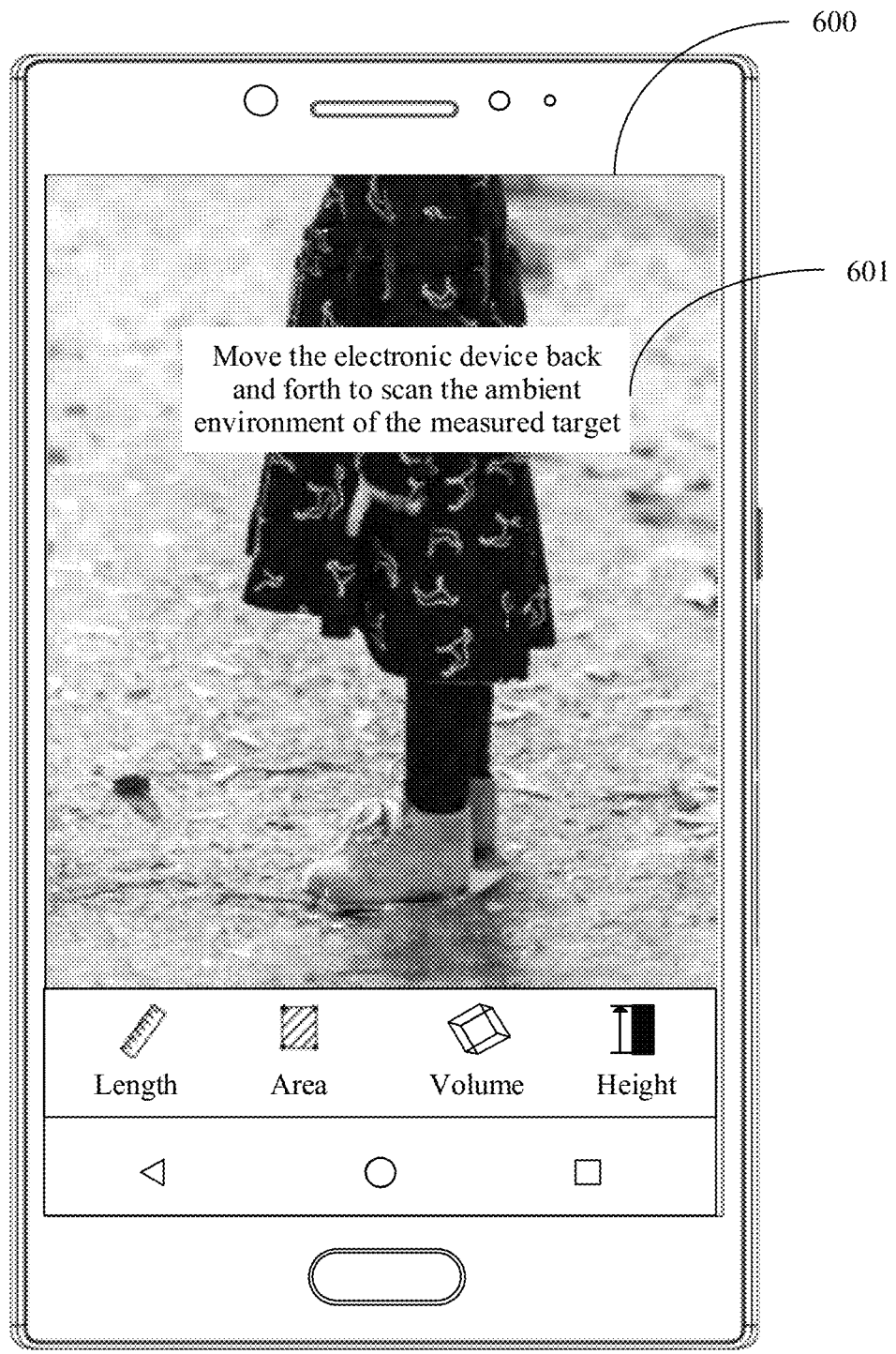
FIG. 6A is a schematic diagram of another user interface according to an embodiment of this disclosure.

In some embodiments, the electronic device 100 may display first prompt information on the display screen 132, where the first prompt information is used to prompt the user to move the electronic device back and forth to scan the ambient environment of the measured target. For example, as shown in FIG. 6A, the electronic device 100 displays a user interface 600 on the display screen 132, and the user interface 600 includes first prompt information. The first prompt information is: move the electronic device back and forth to scan the ambient environment of the measured target. In some other embodiments, the electronic device 100 may play the first indication information in a voice form by using the speaker 161. It may be understood that, in addition to text information, the first indication information in this embodiment of this disclosure may further include a graphic identifier, and the like.

Measuring a height is used as an example. The electronic device 100 may prompt the user to move the electronic device 100 back and forth to scan the ambient environment of the measured target each time of distance measurement, or may prompt the user to move the electronic device 100 back and forth to scan the ambient environment of the measured target only for the first time or several previous times of use, and does not prompt the user again after a quantity of times of use exceeds a first threshold. The first threshold may be preset in the electronic device 100, or may be determined based on some algorithms. This is not limited. For example, the first threshold may be 2, 3, 4, or the like.

Step 503: The electronic device 100 obtains, in response to the operation of moving, by the user, the electronic device 100 back and forth to scan the ambient environment of the measured target, information about the ambient environment of the measured target and posture information of the electronic device 100.

The electronic device 100 may obtain information about the ambient environment of the measured target, for example, information about a plane in the ambient environment of the measured target, based on the image that is of the ambient environment of the measured target and that is captured by the camera 132. The posture information of the electronic device 100 may include a motion posture of the electronic device 100 and/or a value of acceleration in each direction when the electronic device 100 moves. The electronic device 100 may obtain a motion posture of the electronic device 100 by using the gyroscope 140B, and obtain, by using the acceleration sensor 140C, a value of acceleration in each direction when the electronic device 100 moves.

Step 504: The electronic device 100 establishes, based on the information about the ambient environment of the measured target and the posture information of the electronic device 100, a world coordinate system and determines at least one plane in the ambient environment of the measured target, where the at least one plane includes a first reference plane for distance measurement in the world coordinate system.

The first reference plane may be different for different measurement scenarios. For different scenarios, the electronic device 100 may determine the first reference plane based on a preset rule. For example, a scenario may be determined based on a measurement mode selected by the user. The height is used as an example. The first reference plane may be a plane, for example, a ground plane, at which the soles of the measured target are in contact.

For example, the electronic device 100 establishes a world coordinate system based on a simultaneous localization and mapping (simultaneous localization and mapping) algorithm or another algorithm by using the information about the ambient environment of the measured target and the posture information of the electronic device 100, to obtain at least one plane in the environment of the measured target. It should be understood that in the SLAM algorithm, when the electronic device 100 moves, information such as a location and a posture of the electronic device 100 is located by capturing an environment image in real time and repeatedly observing an image feature (for example, a pattern), and then a map is incrementally constructed based on the information such as the location and the posture of the electronic device 100. In this way, a purpose of simultaneous locating and mapping is achieved. It should be noted that, in this embodiment of this disclosure, the world coordinate system may be alternatively established based on another algorithm, to determine at least one plane in the ambient environment of the measured target.

Specifically, in some embodiments, the electronic device 100 may report, to the processor 110, the image that is of the ambient environment of the measured target and that is captured by the camera 131, and the processor 110 obtains the information about the ambient environment of the measured target from the image of the ambient environment of the measured target. The gyroscope 140B of the electronic device 100 may report, to the processor 110, the obtained motion posture of the electronic device 100 and the acceleration that is obtained by the acceleration sensor 140C and that is of the electronic device 100 in each direction when the electronic device moves. The processor 110 establishes, based on the information about the ambient environment of the measured target and the posture information of the electronic device 100, the world coordinate system and determines at least one plane in the ambient environment of the measured target. For example, one or more of an application processor, a dedicated processor, another processor, or the like in the processor 110 may be configured to establish the world coordinate system and determine the at least one plane in the ambient environment of the measured target in step 504. This is not limited.

Step 505: The electronic device 100 aligns, in response to a user operation, a to-be-added first locating point with a center of a locating point location indication box.

Figure 6B:
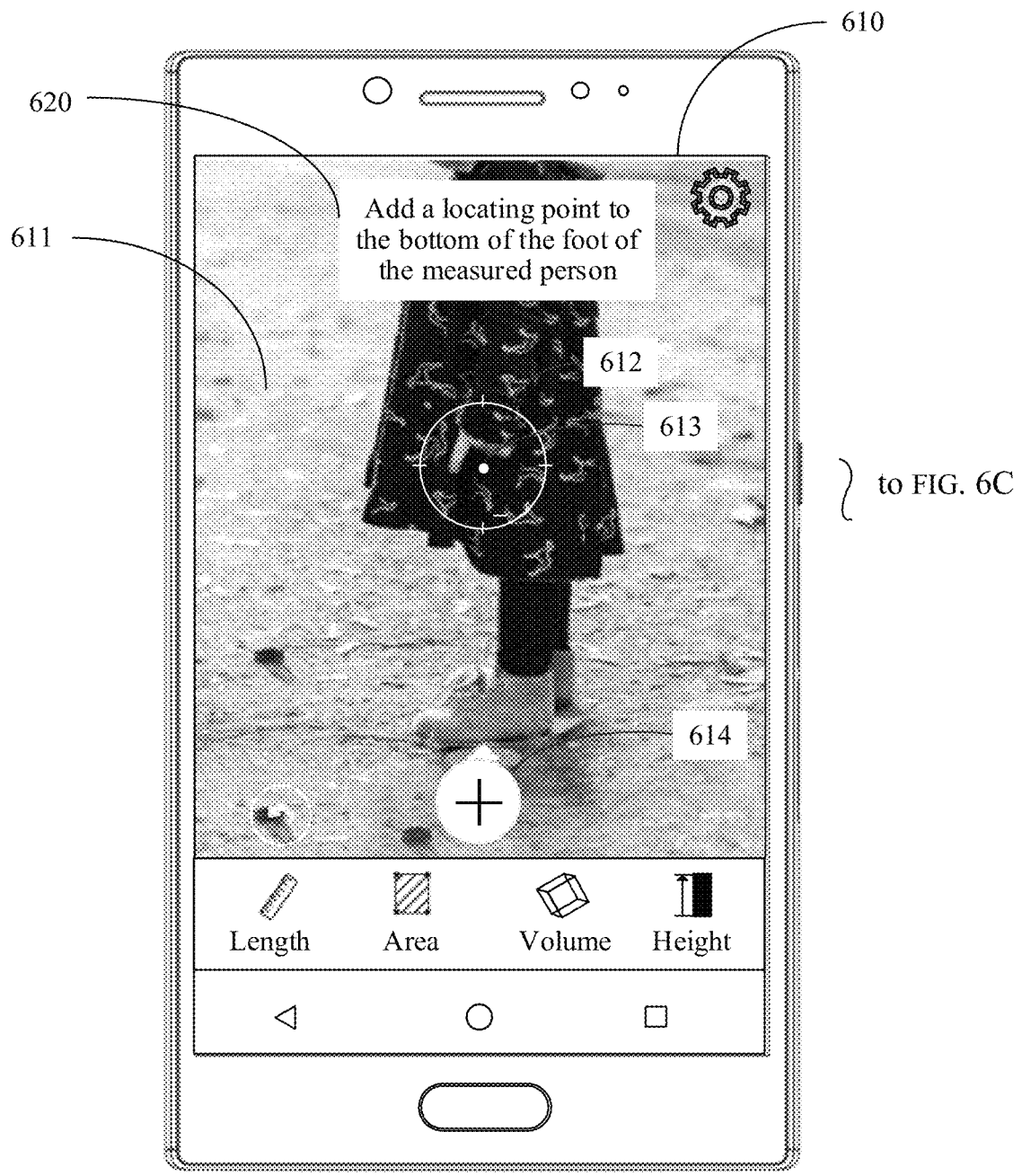
FIG. 6B and FIG. 6C are a schematic diagram of another user interface according to an embodiment of this disclosure.
Figure 6C:
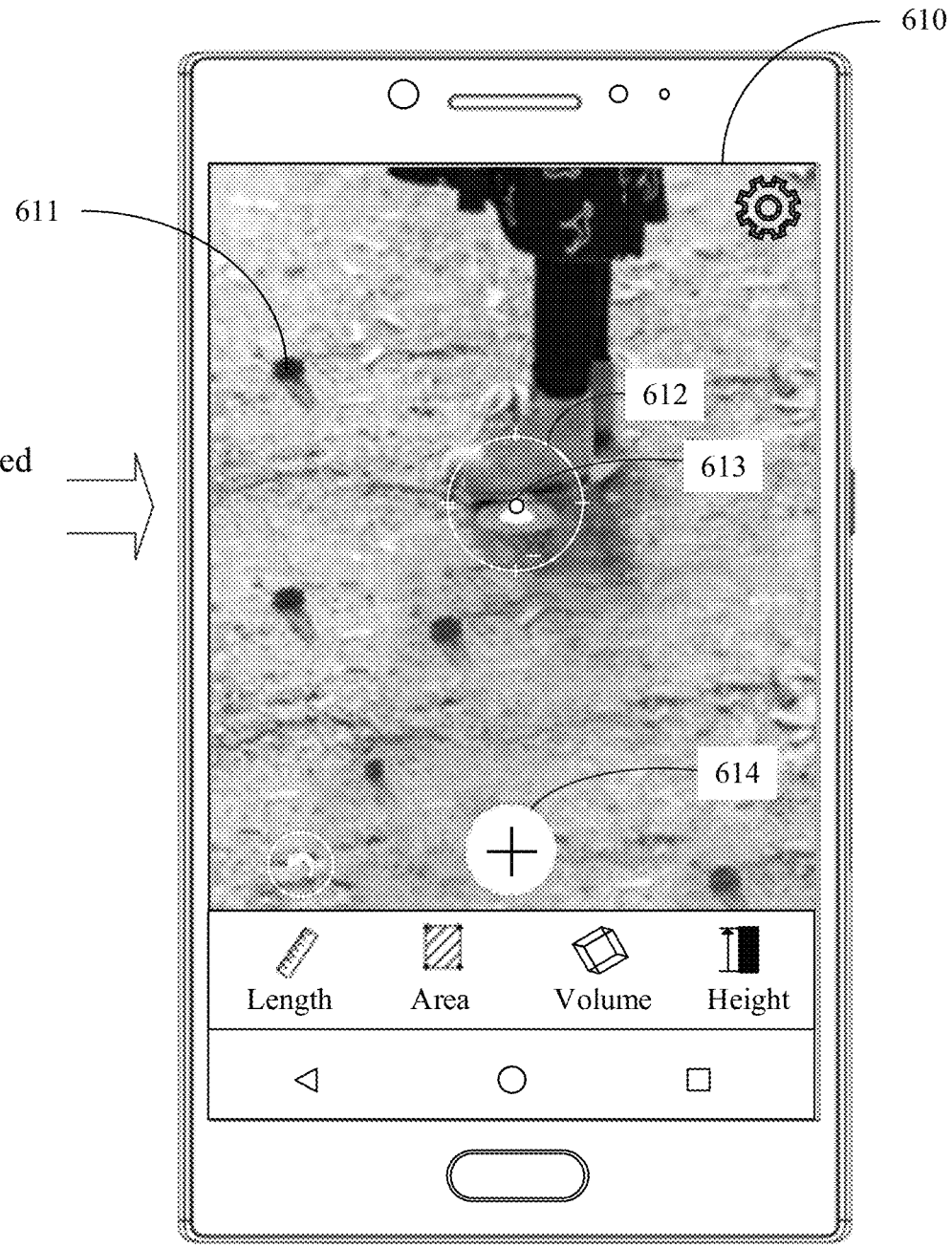

In some embodiments, after performing step 504, the electronic device 100 may prompt the user of a location of the first locating point, thereby facilitating interaction between the user and the electronic device. For example, the electronic device 100 may display second prompt information on the display screen 132. The second prompt information is used to prompt the user of the location of the first locating point. For example, when the user measures a height by using the electronic device 100, the location of the first locating point is a location of the sole of the measured target. As shown in FIG. 6B and FIG. 6C, the electronic device 100 may display second prompt information on a user interface 610 displayed on the display screen 131. The second prompt information may be to add a locating point to the bottom of the foot of the measured person, or may be other information used to indicate the location of the first locating point. For another example, the electronic device 100 may alternatively play the second indication information in a voice form by using the speaker 161. It should be noted that, measuring a height is used as an example. The electronic device 100 may prompt the location of the first locating point each time of distance measurement, or may prompt location information of the first locating point only for the first time or several previous times of use, and does not prompt the user of the location of the first locating point after a quantity of times of use exceeds a second threshold. For a manner of determining the second threshold, refer to a manner of determining the first threshold. The second threshold and the first threshold may be the same, or may be different.

It should be noted that the user operation is related to whether the location of the locating point location indication box is variable. For example, when the location of the locating point location indication frame is fixed, the user operation may be an operation of the mobile electronic device 100. For another example, when the location of the locating point location indication box is variable, the user operation may be an operation of moving the locating point location indication box.

When the center of the location of the locating point location indication box is fixed to the center of the image preview area, the user interface 610 shown in FIG. 6B and FIG. 6C is used as an example. When the user adds a first locating point on the user interface 610 based on an image displayed in an image preview area 611, if an image displayed by the electronic device 100 in the image preview area 601 is an image shown in FIG. 6B, the user needs to move the electronic device 100 downward. In this case, an image captured by the camera 132 of the electronic device 100 is an image displayed in the image preview area 611 shown in FIG. 6C, so that the first locating point is aligned with a center 603 of a locating point location indication box 602.

Step 506: The electronic device 100 adds the first locating point on the user interface in response to an operation of adding a locating point by the user. The first locating point is indicated by coordinates in the image coordinate system.

It should be noted that, the operation of adding the locating point by the user may be an operation on a virtual button used to add the locating point. For details, refer to the foregoing related descriptions.

Step 507: The electronic device 100 determines a second locating point on the user interface. The second locating point is indicated by coordinates in the image coordinate system, and the image coordinate system used to indicate coordinates of the first locating point and the image coordinate system used to indicate coordinates of the second locating point are a same image coordinate system. Projections of the second locating point and the first locating point on the first reference plane are different. For example, a connection line between the first locating point and the second locating point is approximately parallel to an edge of a screen of the electronic device 100. For example, the electronic device 100 is a mobile phone. If the user uses a camera to capture an image when the mobile phone is in portrait mode, a connection line between the first locating point and the second locating point is parallel to an edge of a short side of the screen of the electronic device 100, or there is a relatively small included angle. Usually, the included angle is not equal to 90 degrees, or is not near 90 degrees (for example, 89 degrees).

In some embodiments, the electronic device 100 may automatically determine the second locating point on the user interface based on a preset algorithm. For example, the electronic device 100 may use, as the second locating point, a point in a horizontal direction by using an image coordinate system as a reference. For example, a point that is located on an edge of the display screen 132 in a horizontal direction by using an image coordinate system as a reference is the second locating point.

In some other embodiments, the electronic device 100 may further align the second locating point with a center of the locating point location prompt box in response to an operation of moving the electronic device 100 by the user, and determine the second locating point on the user interface in response to an operation of adding the locating point by the user. For example, when the second locating point is added based on a user operation, after adding the first locating point, the electronic device 100 may prompt the user of a location of the second locating point. For a manner of prompting the location of the second locating point, refer to the manner of prompting the location of the first locating point. Details are not described herein again.

Step 508: The electronic device 100 projects the first locating point to the first reference plane, to obtain a first reference point, and projects the second locating point to the first reference plane, to obtain a second reference point. Distribution of the first reference point and the second reference point is indicated by coordinates in the world coordinate system, and in the world coordinate system, both coordinates of the first reference point and coordinates of the second reference point are coordinates in three-dimensional space.

For example, the electronic device 100 may project the locating point in the image coordinate system onto the first reference plane in a photographing collision manner. For example, the electronic device 100 projects the first locating point onto the first reference plane, to obtain the first reference point. The electronic device 100 may emit a line to the first reference plane at the first locating point, and an intersection point of the emitted line and the first reference plane is the first reference point.

It should be noted that in this embodiment of this disclosure, after obtaining the first locating point, the electronic device 100 may perform the step of projecting the first locating point onto the first reference plane and the step of adding the second locating point. Therefore, the electronic device 100 performs the step of projecting the first locating point onto the first reference plane and step 507 without necessary sequence.

Step 509: The electronic device 100 establishes a second reference plane based on the first reference point and the second reference point, where the second reference plane is perpendicular to the first reference plane.

Figure 7:
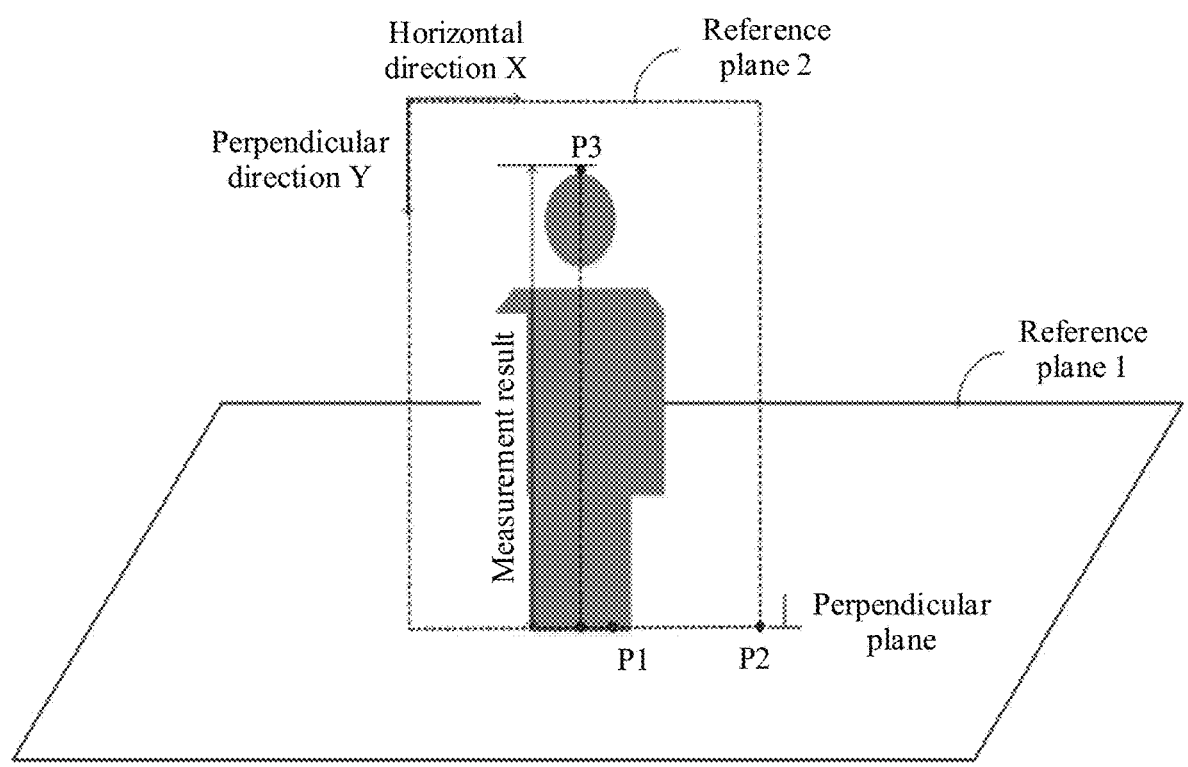
FIG. 7 is a schematic diagram of a measurement result according to an embodiment of this disclosure.

For example, as shown in FIG. 7, the measured target is a person, the first reference plane is a reference plane 1, the first reference point is P1, and the second reference point is P2. In this case, the second reference plane is a reference plane 2, and the reference plane 1 is perpendicular to the reference plane 2. In FIG. 7, a coordinate system of a horizontal direction X and a perpendicular direction Y is an image coordinate system.

Step 510: The electronic device 100 adds a third locating point on the user interface.

In some embodiments, the electronic device 100 may add the third locating point in response to an operation of adding the locating point by the user. For example, for a manner of adding the third locating point, refer to the manner of adding the first locating point. Details are not described herein again.

In some other embodiments, the electronic device 100 may further automatically determine and add the third locating point on the user interface. For example, when a height of the measured target is to be measured, a location of the top of the head in the image displayed in the image preview area may be automatically recognized by using facial recognition, the third locating point is determined based on the location of the top of the head in the image displayed in the image preview area, and the third locating point is added on the user interface.

Figure 8:
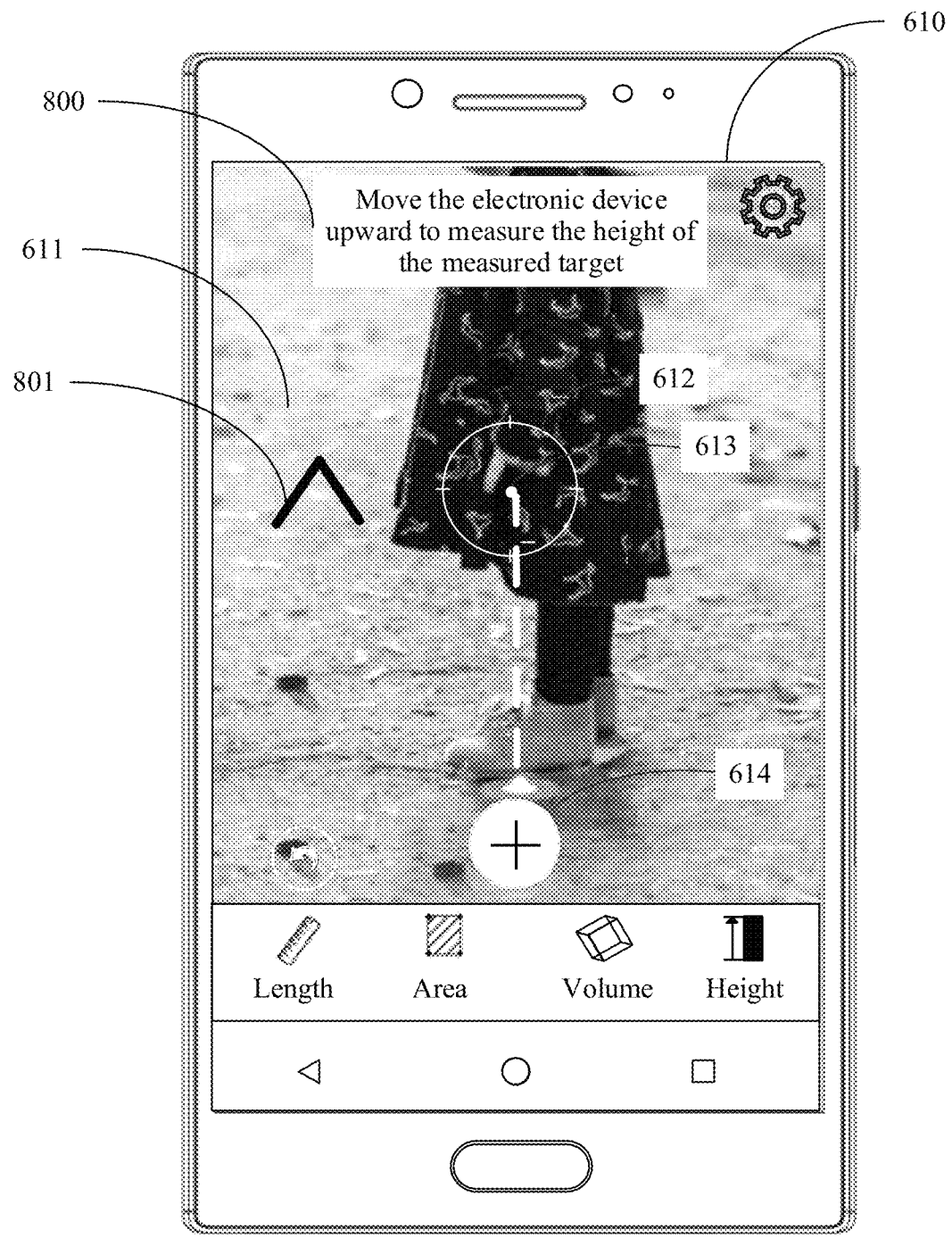
FIG. 8 is a schematic diagram of another user interface according to an embodiment of this disclosure.

In this embodiment of this disclosure, when the electronic device 100 automatically determines the second locating point, because determining the second locating point, obtaining the first reference point and the second reference point, establishing the second reference plane, and the like are all internal implementations of the electronic device 100, and are not perceived by the user, in some embodiments, the electronic device 100 may further prompt, after adding the first locating point, the user to move the electronic device, to implement distance measurement. Measuring a height is used as an example. After adding the first locating point, the electronic device 100 may further prompt the user to move the electronic device upward to measure a height of the measured target. Specifically, the electronic device 100 may display third prompt information on the display screen 132, where the third prompt information is used to prompt the user to move the electronic device upward to measure the height of the measured target. For example, as shown in FIG. 8, the third prompt information may include information 800 of moving the electronic device upward to measure the height of the measured target, and/or a move-up prompt identifier 801. For example, the electronic device 100 may prompt the user to move the electronic device to implement distance measurement in a case in which a measured target is incompletely displayed in an image displayed in the image preview area, or the center of the locating point location indication box is not aligned with the third locating point when the user manually adds the third locating point.

When the electronic device 100 determines the second locating point in response to the operation of adding the locating point by the user, after determining the second locating point, the electronic device 100 may prompt the user to move the electronic device to implement distance measurement. In addition, in an example in which the electronic device 100 determines the second locating point in response to the operation of adding the locating point by the user, the electronic device 100 may further display the second locating point on the user interface.

Step 511: The electronic device 100 projects the third locating point onto the second reference plane, to obtain a third reference point, where distribution of the first reference point and the second reference point is indicated by coordinates in the world coordinate system.

Step 512: The electronic device 100 measures a perpendicular distance from the third reference point to the first reference plane, to obtain a measurement result.

For example, as shown in FIG. 7, the measured target is a person, the first reference plane is a reference plane 1, the first reference point is P1, and the second reference point is P2. In this case, the second reference plane is a reference plane 2, the reference plane 1 is perpendicular to the reference plane 2, the third reference point is P3, and a distance between P3 and the reference plane 1 is a height of the measured target.

In some embodiments, the electronic device 100 further displays the measurement result on the display screen 132. This facilitates user viewing.

Figure 9:
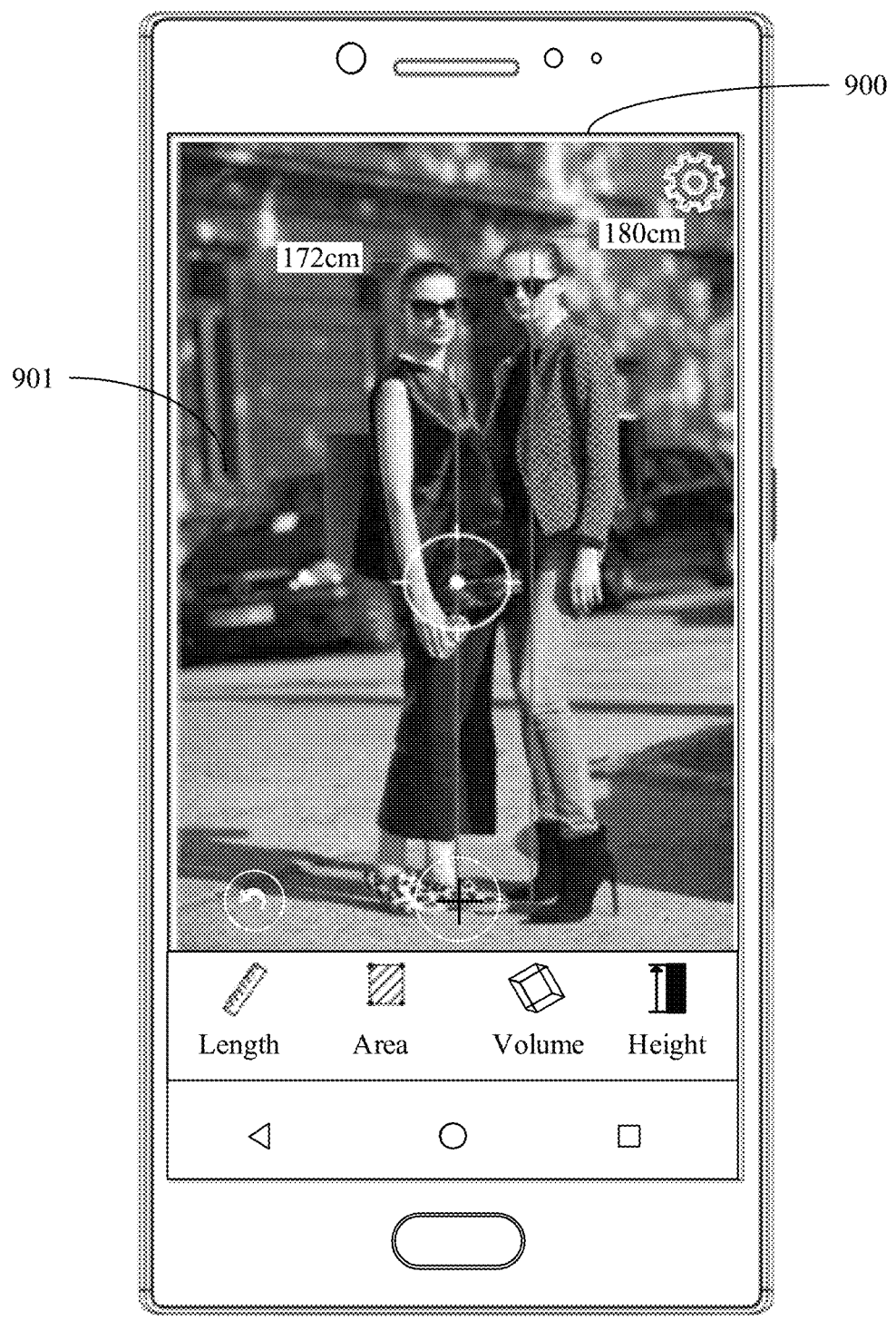
FIG. 9 is a schematic diagram of another user interface according to an embodiment of this disclosure.

It should be noted that, in this embodiment of this disclosure, when the image displayed in the image preview area includes two or a plurality of measured targets, the method in this embodiment of this disclosure may be used to separately measure the plurality of measured targets. Measuring a height is used as an example. In a user interface 900 shown in FIG. 9, an image preview area 901 includes two measured targets, and the electronic device 100 separately measures heights of the two measured targets by using the distance measurement method in this embodiment of this disclosure, to obtain two measurement results. For example, after obtaining the measurement results of the two measured targets, the electronic device 100 displays, on the user interface 900, that the measurement results are separately displayed for the two measured targets.

With reference to the foregoing embodiments and the accompanying drawings, an embodiment of this disclosure provides a distance measurement method. The method may be implemented in an electronic device 100 having a hardware structure shown in FIG. 1.

Figure 10:
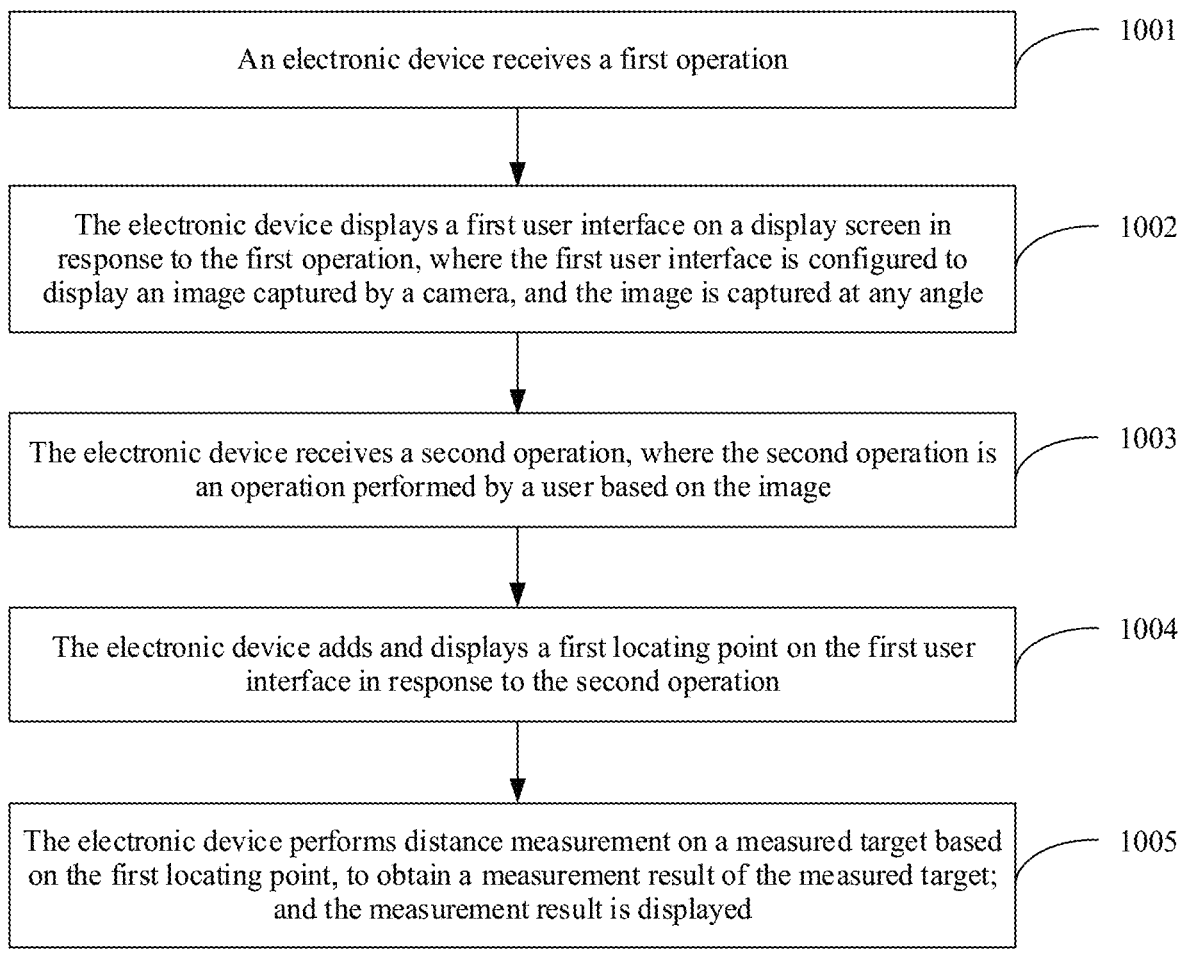
FIG. 10 is a schematic flowchart of another distance measurement method according to an embodiment of this disclosure.

FIG. 10 shows another distance measurement method according to an embodiment of this disclosure. The method includes the following steps.

Step 1001: An electronic device receives a first operation, where the first operation is used to start distance measurement on a measured target.

It should be noted that, for the first operation, refer to the related operation of starting the measuring meter in the foregoing embodiments, and details are not described herein again.

Step 1002: The electronic device displays a first user interface on a display screen in response to the first operation, where the first user interface is configured to display an image captured by a camera, and the image is captured at any angle.

Step 1003: The electronic device receives a second operation, where the second operation is an operation performed by a user based on the image.

Step 1004: The electronic device adds and displays a first locating point on the first user interface in response to the second operation.

For the second operation, refer to the related operation of adding the locating point on the user interface in the foregoing embodiments. Details are not described herein again.

Step 1005: The electronic device performs distance measurement on a measured target based on the first locating point, to obtain a measurement result of the measured target; and the measurement result is displayed.

For a specific related implementation of the distance measurement method shown in FIG. 10 in this embodiment of this disclosure, refer to the foregoing related embodiments.

In some embodiments, an electronic device may perform distance measurement in the following manners.

The electronic device determines a reference locating point based on a first locating point, where a connection line between the reference locating point and the first locating point is approximately parallel to an edge of a screen of the electronic device; and the electronic device performs distance measurement on a measured target based on the first locating point and the reference locating point, to obtain a measurement result.

In some embodiments, the measured target is a person. The first locating point is used to indicate a location of a sole of the measured target. The electronic device may perform distance measurement in the following manners: The electronic device performs facial recognition on an image captured by a camera, and determines a second locating point, where the second locating point is used to indicate a location of the top of the head of the measured target; and the electronic device performs distance measurement on the measured target based on the first locating point and the second locating point, to obtain the measurement result, where the measurement result is used to indicate a height of the measured target.

In some other embodiments, the electronic device may perform distance measurement in the following manners.

The electronic device receives a third operation, where the third operation is an operation performed by a user based on the image; the electronic device adds and displays a second locating point on a first user interface in response to the third operation; and the electronic device performs distance measurement on the measured target based on the first locating point and the second locating point, to obtain the measurement result.

In some embodiments, the electronic device may perform distance measurement based on the following algorithms: The electronic device projects the first locating point onto a first reference plane, to obtain a first reference point, where the first reference plane is determined by the electronic device based on an image of an ambient environment of the measured target; then, the electronic device establishes a second reference plane based on the first reference point and a basic reference point, where the second reference plane is perpendicular to the first reference plane, and the basic reference point is located on the first reference plane and is different from the first reference point; the electronic device projects the second locating point onto the second reference plane, to obtain a second reference point; finally, the electronic device measures a perpendicular distance from the second reference point to the second reference plane, to obtain the measurement result of the measured target.

In some embodiments, the electronic device determines a reference locating point based on the first locating point; and the electronic device projects the reference locating point onto the first reference plane, to obtain the basic reference point.

In some other embodiments, the electronic device receives a fourth operation, where the fourth operation is an operation performed by the user based on the image; then, the electronic device adds and displays a reference locating point on the first user interface in response to the fourth operation; finally, the electronic device projects the reference locating point onto the first reference plane, to obtain the basic reference point.

It should be noted that the basic reference point location in the embodiments of this disclosure is equivalent to the second locating point in the distance measurement method shown in FIG. 5A and FIG. 5B, and the second locating point according to the first aspect of the embodiments of this disclosure is equivalent to the third locating point in the distance measurement method shown in FIG. 5A and FIG. 5B.

The embodiments of this disclosure may be further applied to other distance measurement scenarios such as length measurement and width measurement scenarios, provided that the first reference plane is determined.

The foregoing embodiments of this disclosure may be used independently of each other, or may be used in combination with each other, to achieve different technical effects.

In the foregoing embodiments provided in this disclosure, the methods provided in the embodiments of this disclosure are described from a perspective in which an electronic device serves as an execution body. To implement functions in the method provided in the embodiments of this disclosure, the electronic device may include a hardware structure and/or a software module, and implement the functions in a form of the hardware structure, the software module, or a combination of the hardware structure and the software module. Whether a function in the foregoing functions is performed in the form of the hardware structure, the software module, or both the hardware structure and the software module depends on specific applications and design constraint conditions of the technical solutions.

Figure 11:
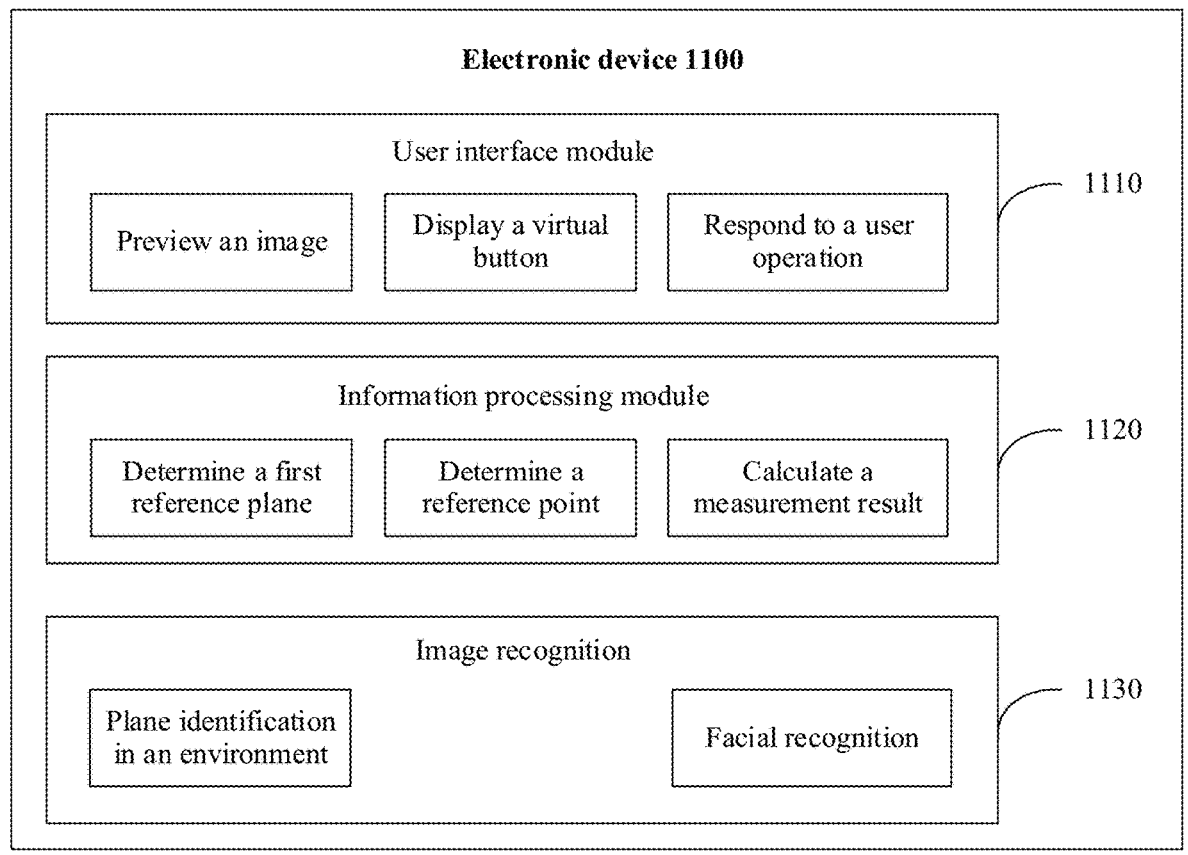
FIG. 11 is a schematic architectural diagram of another electronic device according to an embodiment of this disclosure.

Based on a same concept, FIG. 11 shows an electronic device 1100 according to this application. The electronic device 1100 includes a user interface module 1110, an information processing module 1120, and an image recognition module 1130. For example, the user interface module 1110 may be configured to display a preview image, display a virtual button used to implement a function, respond to a user operation, display a measurement result, and the like. For example, the information processing module 1120 may be configured to determine a reference plane, for example, a first reference plane and a second reference plane. For another example, the information processing module 1120 may be further configured to determine a basic reference point, for example, a basic reference point, a first reference point, or a second reference point. In addition, the information processing module 1120 may be further configured to calculate the measurement result. For example, the image recognition module 1130 may be configured to identify a first reference plane in an ambient environment of a measured target based on an SLAM algorithm. For another example, the image recognition module 1130 may be further configured to perform facial recognition and the like.

In addition, function modules in the embodiments of this disclosure may be integrated into one function module, or each module may exist independently physically, or two or more modules may be integrated into one module.

Figure 12:
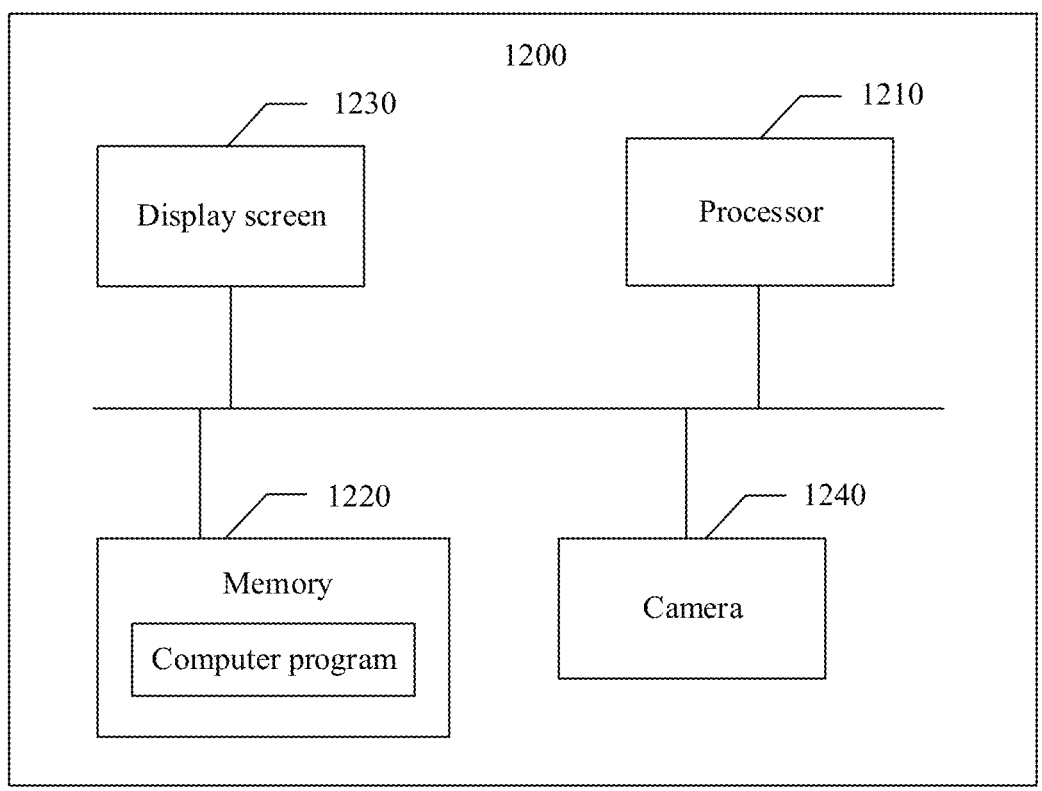
FIG. 12 is a schematic architectural diagram of another electronic device according to an embodiment of this disclosure.

Based on a same concept, as shown in FIG. 12, an embodiment of this disclosure further provides an electronic device 1200. For example, the electronic device 1200 includes a processor 1210, a memory 1220, a display screen 1230, and a camera 1240. The processor 1210 is coupled to the memory 1220, the display screen 1230, and the camera 1240. The coupling in this embodiment of this disclosure may be a communications connection, may be an electrical connection, or may be a connection in another form.

The electronic device 1200 further includes one or more computer programs, where the one or more computer programs are stored in the memory, the one or more computer programs include instructions, and when the instructions are executed by the electronic device, so that the electronic device 1200 is enabled to perform steps performed by the electronic device in the distance measurement method provided in the embodiments of this disclosure. It should be understood that the electronic device 1200 may be configured to implement the distance measurement method in the embodiments of this disclosure. For related features, refer to the foregoing descriptions. Details are not described herein.

The processor in the embodiments may be a general-purpose processor, a digital signal processor (DSP), an application-specific integrated circuit (ASIC), a field-programmable gate array (FPGA) or another programmable logic device, a discrete gate or a transistor logic device, or a discrete hardware component. It may implement or perform the methods, the steps, and logical block diagrams that are disclosed in the embodiments of this disclosure. The general-purpose processor may be a microprocessor, or the processor may be any conventional processor, or the like. Steps of the methods disclosed with reference to the embodiments of this disclosure may be directly executed and accomplished by a hardware decoding processor, or may be executed and accomplished by using a combination of hardware and software modules in a decoding processor. The software modules may be located in a storage medium mature in the art, such as a random-access memory (RAM), a flash memory, a read-only memory (ROM), a programmable read-only memory, an electrically erasable programmable memory, a register, or the like. The storage medium is located in the memory, and a processor reads instructions in the memory and completes the steps in the foregoing methods in combination with hardware of the processor.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented by using some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

When the functions are implemented in the form of a software functional unit and sold or used as an independent product, the functions may be stored in a computer-readable storage medium. Based on such an understanding, the technical solutions of this disclosure essentially, or the part contributing to the conventional technology, or all or a part of the technical solutions may be implemented in the form of a software product. The computer software product is stored in a storage medium and includes several instructions for instructing a computer device (which may be a personal computer, a server, or a network device) or a processor to perform all or a part of the steps of the methods described in the embodiments of this disclosure. The foregoing storage medium includes: any medium that can store program code, for example, a USB flash drive, a removable hard disk, a ROM, a RAM, a magnetic disk, or an optical disc.

The foregoing descriptions are merely specific embodiments of this disclosure, but are not intended to limit the protection scope of this disclosure. Any variation or replacement readily figured out by a person skilled in the art within the technical scope disclosed fall within the protection scope of the claims.

What is claimed is:

1. A distance measurement method implemented by an electronic device having a camera, wherein the method comprises:
receiving a first operation to start distance measurement on a measured target, wherein the measured target is a person;
displaying a first user interface on a display screen in response to the first operation;
displaying an image captured by the camera in the first user interface;
receiving a second operation from a user based on the image;
adding and displaying on the first user interface, in response to the second operation, a first locating point, wherein the first locating point indicates a location of a sole of a foot of the measured target;
performing facial recognition on the image;
determine a second locating point, wherein the second locating point indicates a location of a top of a head of the measured target;
performing a distance measurement on the measured target based on the first locating point and the second locating point to obtain a measurement result, wherein the measurement result indicates a height of the measured target; and
displaying the measurement result.

2. The method of claim 1, wherein performing the distance measurement on the measured target based on the first locating point to obtain a measurement result of the measured target comprises:
determining a reference locating point based on the first locating point, wherein a connection line between the reference locating point and the first locating point is approximately parallel to an edge of the display screen; and
performing the distance measurement based on the first locating point and the reference locating point to obtain the measurement result.

3. The method of claim 1, wherein performing the distance measurement on the measured target based on the first locating point to obtain a measurement result of the measured target comprises:
receiving a third operation from the user based on the image;
adding and displaying a second locating point on the first user interface in response to the third operation; and
performing the distance measurement on the measured target based on the first locating point and the second locating point to obtain the measurement result.

4. The method of claim 3, wherein performing the distance measurement on the measured target based on the first locating point and the second locating point to obtain the measurement result further comprises:
projecting the first locating point onto a first reference plane to obtain a first reference point, wherein the first reference plane is based on an ambient image of an ambient environment of the measured target;
establishing a second reference plane based on the first reference point and a basic reference point, wherein the second reference plane is perpendicular to the first reference plane, and wherein the basic reference point is located on the first reference plane and is different from the first reference point;
projecting the second locating point onto the second reference plane to obtain a second reference point; and
measuring a perpendicular distance from the second reference point to the second reference plane to obtain the measurement result.

5. The method of claim 4, further comprising:
determining a reference locating point based on the first locating point; and
projecting the reference locating point onto the first reference plane to obtain the basic reference point.

6. The method of claim 4, further comprising:
receiving a fourth operation from the user based on the image;
adding and displaying a reference locating point on the first user interface in response to the fourth operation; and
projecting the reference locating point onto the first reference plane to obtain the basic reference point.

7. The method of claim 1, wherein performing the distance measurement on the measured target based on the first locating point and the second locating point, to obtain the measurement result further comprises:
projecting the first locating point onto a first reference plane to obtain a first reference point, wherein the first reference plane is based on an ambient image of an ambient environment of the measured target;
establishing a second reference plane based on the first reference point and a basic reference point, wherein the second reference plane is perpendicular to the first reference plane, and wherein the basic reference point is located on the first reference plane and is different from the first reference point;
projecting the second locating point onto the second reference plane to obtain a second reference point; and
measuring a perpendicular distance from the second reference point to the second reference plane to obtain the measurement result.

8. The method of claim 7, further comprising:
determining a reference locating point based on the first locating point; and
projecting the reference locating point onto the first reference plane to obtain the basic reference point.

9. The method of claim 7, further comprising:
receiving a fourth operation from the user based on the image;
adding and displaying a reference locating point on the first user interface in response to the fourth operation; and
projecting the reference locating point onto the first reference plane, to obtain the basic reference point.

10. The method of claim 1, after the adding and displaying the first locating point, further comprising displaying prompt information, wherein the prompt information is used to prompt the user to move the electronic device upward to measure the height of the measured target.

11. The method of claim 10, wherein the prompt information comprises a prompt identifier used to prompt upward movement.

12. The method of claim 11, wherein the prompt identifier comprises an upward arrow.

13. An electronic device comprising:
a non-volatile memory configured to store program instructions;
a display screen;
a camera; and
a processor operably coupled to the display screen, the memory, and the camera, wherein the program instructions when executed by the processor cause the electronic device to:
receive a first operation to start distance measurement on a measured target, wherein the measured target is a person;
display a first user interface on the display screen in response to the first operation;
display an image captured by the camera in the first user interface;
receive a second operation performed by a user based on the image;
add and display on the first user interface, in response to the second operation, a first locating point, wherein the first locating point indicates a location of a sole of a foot of the measured target;
perform facial recognition on the image;
to determine a second locating point to indicate a location of a top of a head of the measured target;
perform distance measurement on the measured target based on the first locating point and the second locating point to obtain a measurement result, wherein the measurement result indicates a height of the measured target; and
display the measurement result on the first user interface.

14. The electronic device of claim 13, wherein performing distance measurement on the measured target based on the first locating point to obtain a measurement result of the measured target comprises:
determining a reference locating point based on the first locating point, wherein a connection line between the reference locating point and the first locating point is approximately parallel to an edge of the display screen of the electronic device; and
performing distance measurement on the measured target based on the first locating point and the reference locating point to obtain the measurement result.

15. The electronic device of claim 13, wherein performing distance measurement on the measured target based on the first locating point to obtain a measurement result of the measured target comprises:
receiving a third operation performed by the user based on the image;
adding and displaying a second locating point on the first user interface in response to the third operation; and
performing distance measurement on the measured target based on the first locating point and the second locating point to obtain the measurement result.

16. The electronic device of claim 13, wherein performing distance measurement on the measured target based on the first locating point and the second locating point to obtain the measurement result further comprises:
projecting the first locating point onto a first reference plane to obtain a first reference point, wherein the first reference plane is determined based on an image of an ambient environment of the measured target;
establishing a second reference plane based on the first reference point and a basic reference point, wherein the second reference plane is perpendicular to the first reference plane, and wherein the basic reference point is located on the first reference plane and is different from the first reference point;
projecting the second locating point onto the second reference plane to obtain a second reference point; and
measuring a perpendicular distance from the second reference point to the second reference plane to obtain the measurement result.

17. The electronic device of claim 16, wherein the instructions, when executed, cause the electronic device to:
determine a reference locating point based on the first locating point; and
project the reference locating point onto the first reference plane to obtain the basic reference point.

18. The electronic device of claim 16, wherein the instructions, when executed, cause the electronic device to:
receive a fourth operation performed by the user based on the image;
add and display a reference locating point on the first user interface in response to the fourth operation; and
project the reference locating point onto the first reference plane to obtain the basic reference point.

19. A computer program product comprising instructions that are stored on a computer-readable medium and that, when executed by a processor, cause an electronic device having a camera to:
receive a first operation to start distance measurement on a measured target, wherein the measured target is a person;
display a first user interface on the display screen in response to the first operation;
display an image captured by the camera on the first user interface;
receive a second operation performed by a user based on the image;
add and displaying on the first user interface, in response to the second operation, a first locating point, wherein the first locating point indicates a location of a sole of a foot of the measured target;
perform facial recognition on the image;
to determine a second locating point to indicate a location of a top of a head of the measured target;
perform distance measurement on the measured target based on the first locating point and the second locating point to obtain a measurement result, wherein the measurement result indicates a height of the measured target; and
display the measurement result on the first user interface.

20. The computer program product of claim 19, wherein when executed by the processor, the instructions further cause the electronic device to:
determine a reference locating point based on the first locating point, wherein a connection line between the reference locating point and the first locating point is approximately parallel to an edge of the display screen of the electronic device; and perform distance measurement on the measured target based on the first locating point and the reference locating point to obtain the measurement result.

\* \* \* \* \*